US012538868B2

United States Patent
(12)

Anderson et al.

(10) Patent No.: US 12,538,868 B2

(45) **Date of Patent: *Feb. 3, 2026**

(54) MACHINE CONTROL USING REAL-TIME MODEL

(71) Applicant: Deere & Company, Moline, IL (US)

(72) Inventors: Noel W. Anderson, Fargo, ND (US); Nathan R. Vandike, Geneseo, IL (US); Federico Pardina-Malbran, Fort Collins, CO (US); Bhanu Kiran Reddy Palla, Bettendorf, IL (US)

(73) Assignee: Deere & Company, Moline, IL (US)

( * ) Notice: Subject to any disclaimer, the term of this patent is extended or adjusted under 35 U.S.C. 154(b) by 322 days.

This patent is subject to a terminal disclaimer.

(21) Appl. No.: 18/446,223

(22) Filed: Aug. 8, 2023

(65) Prior Publication Data

US 2023/0380346 A1 Nov. 30, 2023

Related U.S. Application Data

(63) Continuation of application No. 16/380,564, filed on Apr. 10, 2019, now Pat. No. 11,778,945.

(51) Int. Cl.

| | |
|---|---|
| ***A01D 41/127*** | (2006.01) |
| ***A01D 43/08*** | (2006.01) |
| ***G05B 13/04*** | (2006.01) |
| ***H04W 4/021*** | (2018.01) |

(52) U.S. Cl.

CPC ......... *A01D 41/127* (2013.01); *A01D 43/085* (2013.01); *G05B 13/048* (2013.01); *H04W 4/021* (2013.01)

(58) Field of Classification Search

None

See application file for complete search history.

(56) References Cited

U.S. PATENT DOCUMENTS

| | | | | |
|---|---|---|---|---|
| 2011/0282187 | A1* | 11/2011 | Harlev | A61B 5/0536 600/424 |
| 2012/0004813 | A1* | 1/2012 | Baumgarten | A01D 41/127 701/50 |
| 2014/0215984 | A1* | 8/2014 | Bischoff | A01B 79/005 56/10.2 R |
| 2017/0336533 | A1* | 11/2017 | Alvarez | G01S 13/87 |

(Continued)

FOREIGN PATENT DOCUMENTS

| | | | | |
|---|---|---|---|---|
| DE | 102017216729 A1 * | 3/2019 | | G01N 33/30 |
| EP | 2718671 B1 * | 2/2018 | | G06F 30/20 |
| WO | WO-2019031853 A1 * | 2/2019 | | G09B 29/00 |

*Primary Examiner* — Jelani A Smith

*Assistant Examiner* — Jacob Daniel Underbakke

(74) *Attorney, Agent, or Firm* — Kelly, Holt & Christenson; Joseph R. Kelly

(57) ABSTRACT

A priori georeferenced vegetative index data is obtained for a worksite, along with field data that is collected by a sensor on a work machine that is performing an operation at the worksite. A predictive model is generated, while the machine is performing the operation, based on the georeferenced vegetative index data and the field data. A model quality metric is generated for the predictive model and is used to determine whether the predictive model is a qualified predicative model. If so, a control system controls a subsystem of the work machine, using the qualified predictive model, and a position of the work machine, to perform the operation.

19 Claims, 15 Drawing Sheets

100 132 150 101 136 110 134 112 148 114 146 126 138 116 122 108 106 102 152 142 140 128 130 124 118 120 147 144 157 104

(56) References Cited

U.S. PATENT DOCUMENTS

| | | | | |
|---|---|---|---|---|
| 2018/0018517 | A1* | 1/2018 | Zhong | G06V 20/188 |
| 2019/0107836 | A1* | 4/2019 | Walker | G06V 20/56 |
| 2019/0347745 | A1* | 11/2019 | Bones | G06Q 50/02 |
| 2021/0350578 | A1* | 11/2021 | Satoh | G06T 7/0002 |

* cited by examiner

| Identifier | Georef. Location | Data Source | Prediction Type=Yield (bu/acr) | Quality Score |
|---|---|---|---|---|
| 511a | Portion 531 | NDVI | 200 | High |
| 511b | Portion 531 | Stalk dia. | 205 | High |
| 511c | Portion 531 | Adj. pass | 200 | High |
| 511d | Portion 531 | FLP | 190 | High |
| | | | | |
| 512a | Portion 532 | NDVI | 195 | Medium |
| 512b | Portion 532 | Stalk dia. | 250 | Medium |
| 512c | Portion 532 | Adj. pass | 200 | Medium |
| 512d | Portion 532 | FLP | 175 | High |
| | | | | |
| 513a | Portion 533 | NDVI | 205 | Low |
| 513b | Portion 533 | Stalk dia. | 190 | Low |
| 513c | Portion 533 | Adj pass | 150 | Medium |
| 513d | Portion 533 | FLP | 10 | Low |

FIG. 4B

| Rule # | Condition | Quality Score |
|---|---|---|
| 1 | If no other rules apply, an individual quality score is | High |
| 2 | If multiple predictions have the highest quality scores, take their average predicted value | -- |
| 3 | Camera-based: If detected airborne dust is moderate | Medium |
| 4 | Camera-based: If detected airborne dust is high | Low |
| 5 | V12 NDVI-based: If not irrigated and drought conditions | Low |
| 6 | V12 NDVI-based: If partially irrigated and drought conditions | Medium |
| 7 | Stalk diameter: If conditions are somewhat weedy, | Medium |
| 8 | Stalk diameter: If conditions are very weedy, | Low |
| 9 | Adj pass: If irrigation status of current and adjacent passes are partially different, | Medium |
| 10 | Adj pass: If irrigation status of current and adjacent passes are totally different, | Low |
| 11 | Stalk diameter: If drought conditions after vegetative stage, | Low |

FIG. 4C

MACHINE CONTROL USING REAL-TIME MODEL

CROSS-REFERENCE TO RELATED APPLICATION

The present application is a continuation of and claims priority of U.S. patent application Ser. No. 16/380,564 filed Apr. 10, 2019, the content of which is hereby incorporated by reference in its entirety.

FIELD OF THE DESCRIPTION

The present description relates to work machines. More specifically, the present description relates to a control system that dynamically, during runtime, senses data and generates and qualifies a predictive model and controls the work machine using that model.

BACKGROUND

There are a wide variety of different types of work machines. Those machines can include construction machines, turf management machines, forestry machines, agricultural machines, etc.

Some current systems have attempted to use a priori data to generate a predictive model that can be used to control the work machine. For instance, agricultural harvesters can include combine harvesters, forage harvesters, cotton harvesters, among other things. Some current systems have attempted to use a priori data (such as aerial imagery of a field) in order to generate a predictive yield map. The predicative yield map predicts yields at different geographic locations in the field being harvested. The current systems have attempted to use that predictive yield map in controlling the harvester.

The discussion above is merely provided for general background information and is not intended to be used as an aid in determining the scope of the claimed subject matter.

SUMMARY

A priori georeferenced vegetative index data is obtained for a worksite, along with field data that is collected by a sensor on a work machine that is performing an operation at the worksite. A predictive model is generated, while the machine is performing the operation, based on the georeferenced vegetative index data and the field data. A model quality metric is generated for the predictive model and is used to determine whether the predictive model is a qualified predicative model. If so, a control system controls a subsystem of the work machine, using the qualified predictive model, and a position of the work machine, to perform the operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4B is a chart showing an example set of georeferenced a priori data for the field, shown in FIG. 4A.

FIG. 4C is a chart showing an example set of rules utilized by a model evaluation system.

DETAILED DESCRIPTION

Figure 1:
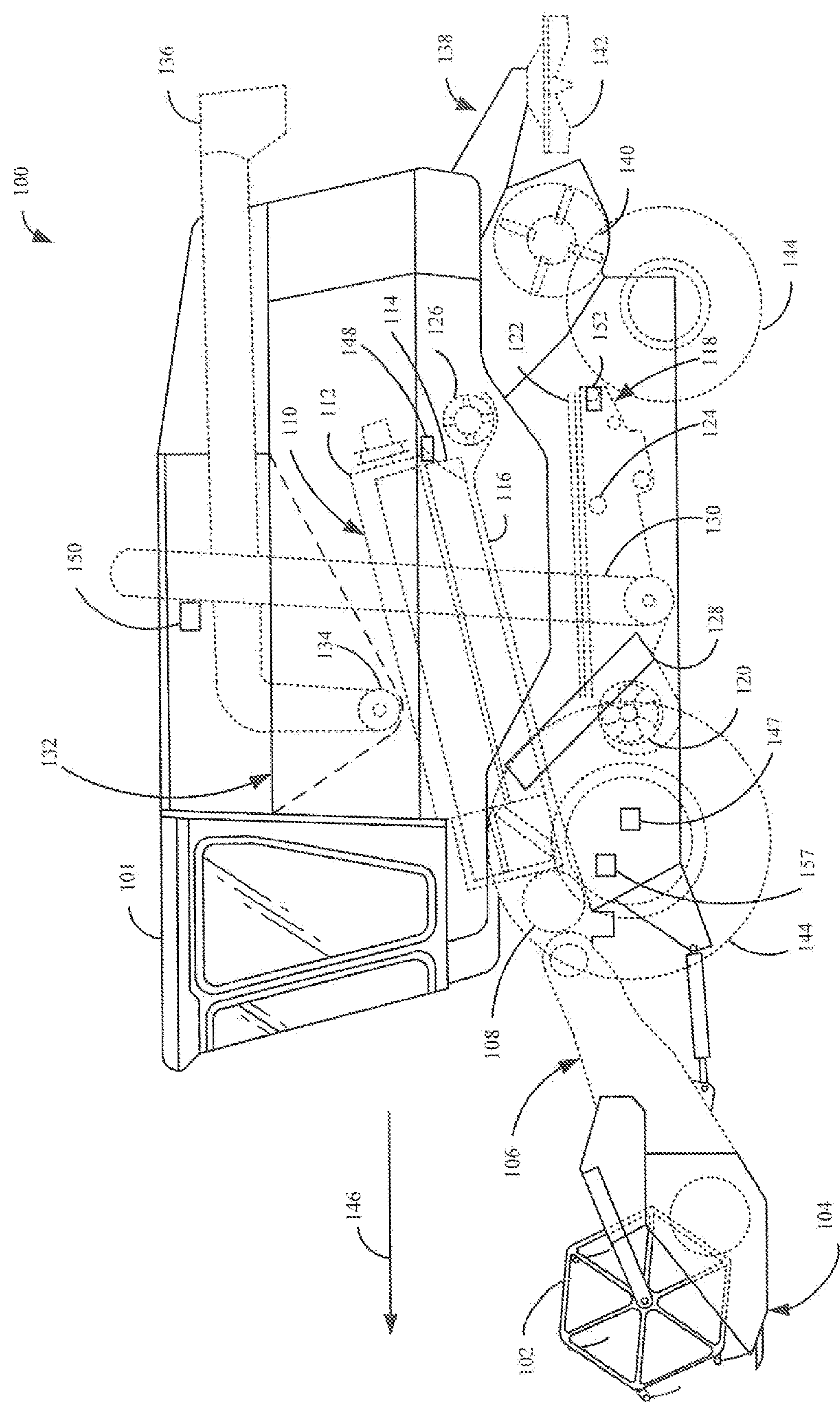
FIG. 1 is a partial schematic, partial pictorial illustration of a combine harvester.

As discussed above, some current systems attempt to use a priori data (such as aerial images) in order to generate a predictive map that can be used to control a work machine. By way of example, there has been a great deal of work done in attempting to generate a predictive yield map for a field, based upon vegetation index values generated from aerial imagery. Such predictive yield maps attempt to predict a yield at different locations within the field. The systems attempt to control a combine harvester (or other harvester) based upon the predicted yield.

Also, some systems attempt to use forward looking perception systems, which can involve obtaining optical images of the field, forward of a harvester in the direction of travel. A yield can be predicted for the area just forward of the harvester, based upon those images. This is another source of a priori data that can be used to generate a form of a predictive yield map.

All of these types of systems can present difficulties.

For instance, none of the models generated based on a priori data represent actual, ground truth data. For instance, they only represent predictive yield, and not actual ground truthed yield values. Therefore, some systems have attempted to generate multiple different models, and then assign them a quality score based upon historic performance. For instance, a remote server environment can obtain a priori aerial image data and generate a predictive yield map. The remote server environment can then receive actual yield data generated when that field was harvested. It can determine the quality or accuracy of the model, based upon the actual yield data. The predictive yield model, or the algorithm used to create the model, can then be modified to improve it.

However, this does not help in controlling the harvester, during the harvesting operation. Instead, the actual yield data is provided to the remote server environment, after the harvesting operation is completed, so that the model can be improved for the next harvesting season, for that field.

In contrast, the following description describes a system and method for generating a predictive model based not only on a priori data, but based upon in situ, field data that represents actual values being modeled. For instance, where the predictive map is a predictive yield map, the model used to generate that map is dynamically generated based upon a priori data (such as aerial imagery data) and in situ data, such as actual yield data sensed on the harvester during the harvesting operation. Once the predictive yield map is generated, the model (e.g., the predictive map) used to generate it is evaluated to determine its accuracy (or quality). If the quality of the model is sufficient, it is used for controlling the combine, during the harvesting operation, and it is dynamically, and iteratively, evaluated using in situ data, collected from the combine during the harvesting operation. If the model does not have a high enough quality, then the system can dynamically switch to an alternate model, or it can switch back to manual operation or preset values, or it can generate and evaluate other alternative models.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axel, or other components. The travel speed and position of combine 100 can also be sensed by a positioning system 157, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation or pose of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense yield as mass flow rate of grain through elevator 130, correlated to a position from which it was harvested, as indicated by position sensor 157, or provide other output signals indicative of other sensed variables. Some additional examples of the types of sensors that can be used are described below.

Figure 2A:
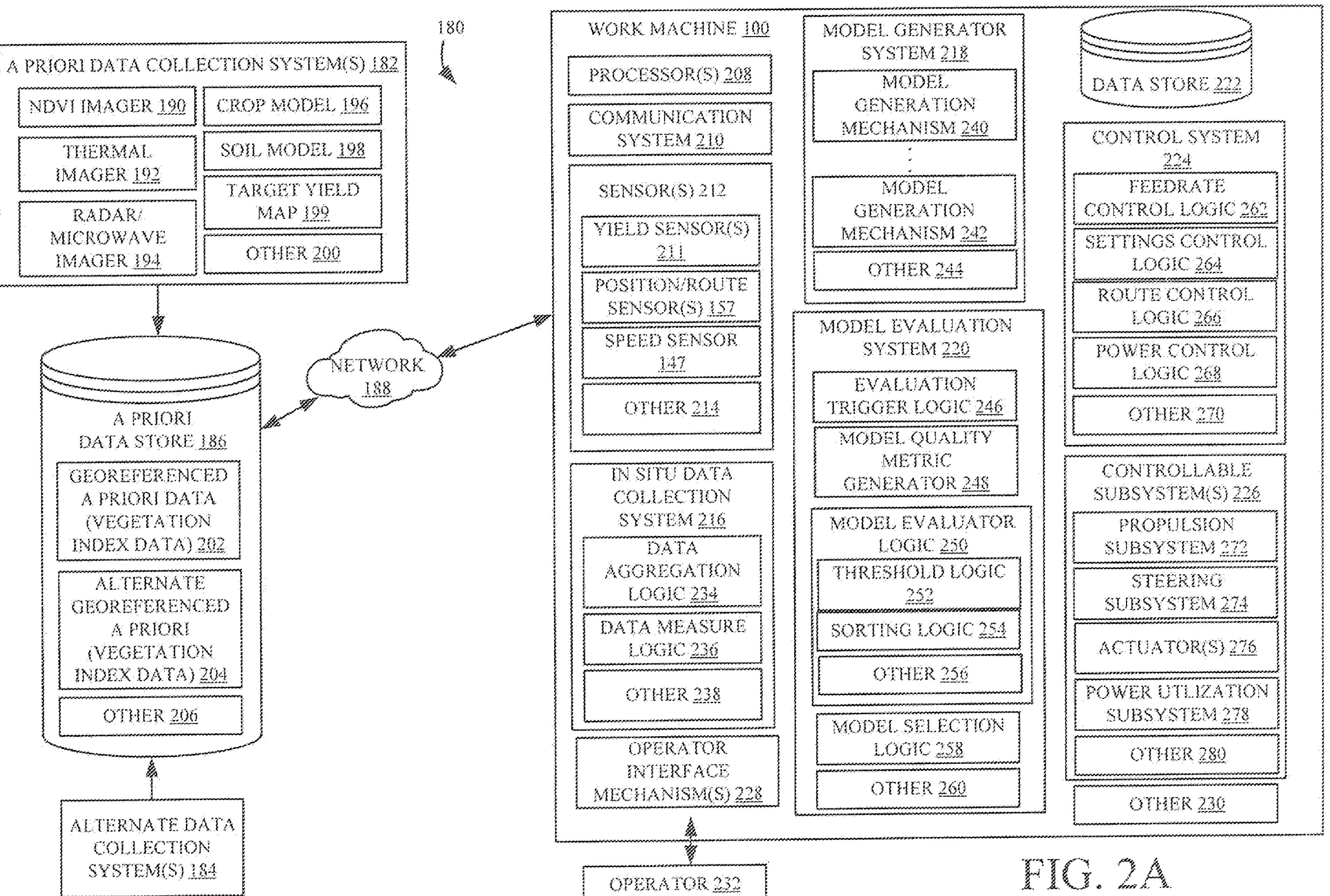
FIG. 2A is a block diagram showing one example of a computing system architecture that includes the combine harvester shown in FIG. 1.

FIG. 2A is a block diagram showing one example of a computing system architecture 180 that includes work machine 100, a priori data collection systems 182, alternate data collection systems 184, and a priori data store 186 which is connected to work machine 100 by network 188. Some items shown in FIG. 2A are similar to those shown in FIG. 1, and they are similarly numbered.

Network 188 can be any of a wide variety of different types of networks. For instance, it can be a wide area network, a local area network, a near field communication network, a cellular communication network, or any of a wide variety of other networks, or combinations of networks.

A priori data collection systems 182 illustratively collect a priori data that can be used by work machine 100 to generate a model (such as a predictive map) that can be used to control work machine 100. Thus, in one example, systems 182 can include normalized difference vegetation index imager 190, thermal imager 192, radar/microwave imager 194, crop model data 196, soil model data 198, and it can include a wide variety of other items 200. NDVI imager 190 can include such things as aerial imaging systems (e.g., satellite systems, manned or unmanned aerial vehicle imaging systems, etc.) that can be used to take images from which NDVI values can be generated. Thermal imager 192 illustratively includes one or more thermal imaging sensors that generate thermal data. Radar/microwave imager 194 illustratively generates radar or microwave images. A crop model 196 can be used to generate data which is predictive of certain characteristics of the crop, such as yield, moisture, etc. Soil model 198 is illustratively a predictive model that generates characteristics of soil at different locations in a field. Such characteristics can include soil moisture, soil compaction, soil quality or content, etc. Target yield management map 199 is illustratively a map created by operator 232 or another manager of the field, that is indicative of the desired yield values across a field which can be based on such things as historical information.

All of these systems 182 can be used to generate data directly indicative of metric values, or from which metric values can be derived, and used in controlling work machine 100. They can be deployed on remote sensing systems, such as unmanned aerial vehicles, manned aircraft, satellites, etc. The data generated by systems 182 can include a wide variety of other things as well, such as weather data, soil type data, topographic data, human-generated maps based on historical information, and a wide variety of other systems for generating data corresponding to the worksite on which work machine 100 is currently deployed.

Alternate data collection systems 184 may be similar to systems 182, or different. Where they are the same or similar, they may collect the same types of data, but at different times during the growing season. For instance, some aerial imagery generated during a first time in the growing season may be more helpful that other aerial imagery that was captured later in the growing season. This is just one example.

Alternate data collection systems 184 can include different collection systems as well, that generate different types of data about the field where work machine 100 is deployed. In addition, alternate data collection systems 184 can be similar to systems 182, but they can be configured to collect data at a different resolution (such as at a higher resolution, a lower resolution, etc.). They can also be configured to capture the same type of data using a different collection mechanism or data capturing mechanism which may be more or less accurate under different criteria.

Figure 2B:
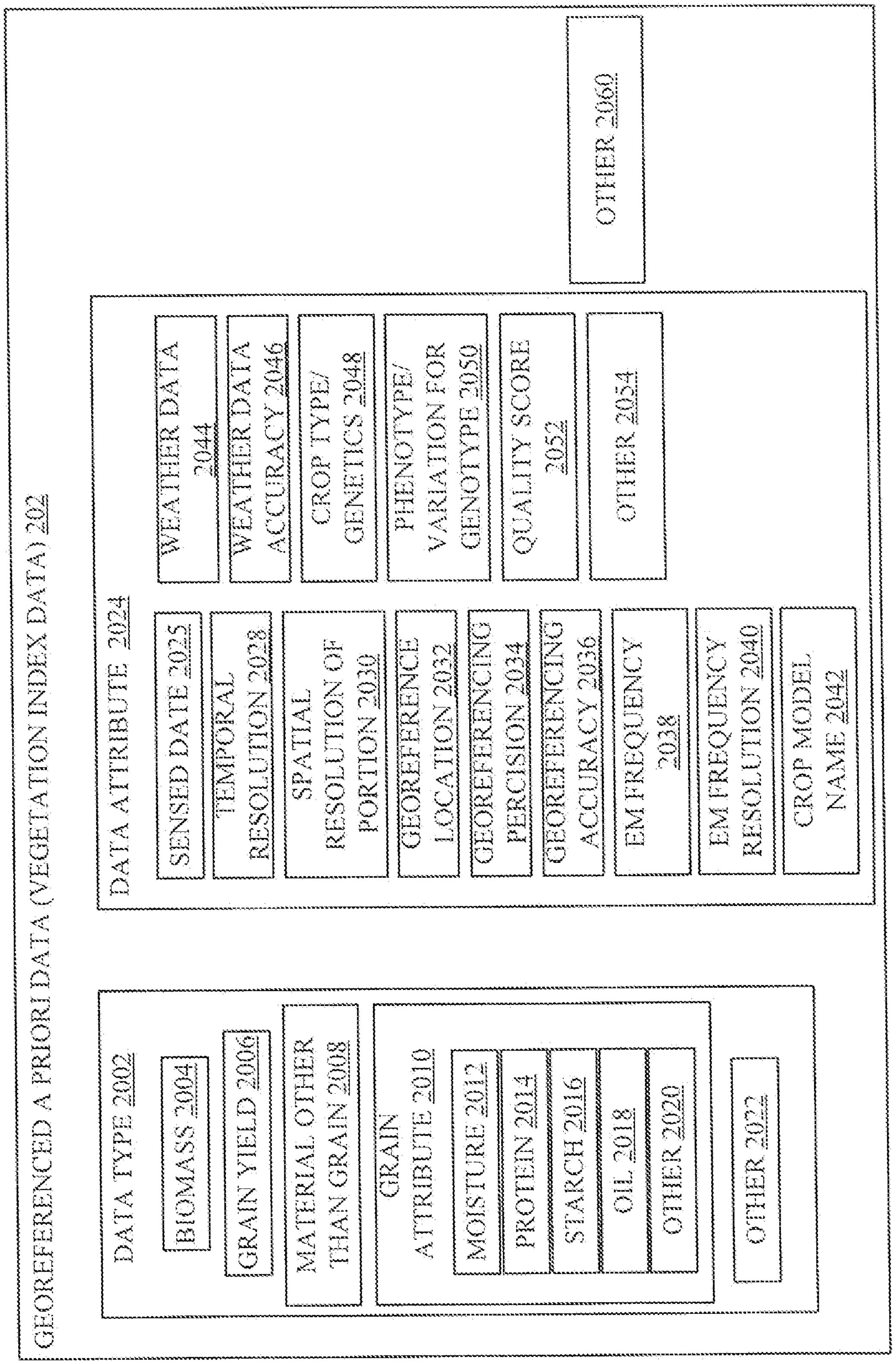
FIG. 2B is a block diagram showing one example set of georeferenced a priori data.

A priori data store 186 thus includes georeferenced a priori data 202 as well as alternate georeferenced a priori data 204. It can include other items 206 as well. Data 202 may be, for example, vegetation index data which includes vegetation index values that are georeferenced to the field being harvested. The vegetation index data may include such things as NDVI data, leaf area index data, soil adjusted vegetation index (SAVI) data, modified or optimized SAVI data, simple ratio or modified simple ratio data, renormalized difference vegetation index data, chlorophyll/pigment related indices (CARI), modified or transformed CARI, triangular vegetation index data, structural insensitive pigment index data, normalized pigment chlorophyll index data, photochemical reflectance index data, red edge indices, derivative analysis indices, among a wide variety of others, some are shown in FIG. 2B. In another example, a priori data 202 includes a georeferenced prediction.

FIG. 2B is a block diagram showing one example set of georeferenced predicted or a priori data 202. Illustratively a priori data 202 includes data types 2002 and data attributes 2024 and can include other items as well, as indicated by block 2060. Data types 2002 can be of one or more of the following, without limitation, crop biomass 2004, crop grain yield 2006, material other than grain (MOG) 2008, grain attributes 2010 and can include other items as well, as indicated by block 2022.

Crop biomass 2004 can be indicative of the predicted amount of biomass in the given section of the field. For example, biomass may be indicated as a mass unit (kg) over an area unit ($m^2$). Crop grain yield 2006 can be indicative of the predicted amount of yield in the given section of the field. For example, crop grain yield may be indicated as a yield unit (bushel) over an area unit (acre).

Grain attributes 2010 can include a variety of different attributes. As indicated by block 2012, the grain moisture can be estimated. As indicated by block 2014, the grain protein can be estimated. As indicated by block 2016, the grain starch can be predicted. As indicated by block 2018, the grain oil can be predicted. Of course, these are only examples and other crop attributes may also be sensed, estimated or predicted, as indicated by block 2020.

Data attributes 2024 can include a variety of different attributes some of which are applicable for one set of a priori data and not another. For example, EM frequency 2038 may only be applicable if the data was gathered by a sensor sensing some characteristic related to electro magnetism. The attribute data source 2025 indicates the source of data to make the prediction. For example, data source 2025 is indicative of one or more of a priori data collection systems 182. The attribute sensed date 2026 indicates the date that the data was sensed. The attribute temporal resolution 2028 indicates the amount of time that the data was gathered over (e.g., a single image would have a minimal temporal resolution). The attribute spatial resolution 2030 indicates the spatial resolution sensed, that is the minimal unit of area that the given sensor can sense accurately. The geospatial location 2032 is indicative of the location being sensed. The geospatial precision 2034 is indicative of the precision or statistical variation of the geospatial sensor. The geospatial accuracy 2036 is indicative of the trueness of the geospatial sensor. The frequency 2038 is indicative of the frequency of the EM sensor. The EM resolution 2040 is indicative of the resolution of an EM sensor. The identifier 2042, is indicative of a name or number of the crop model that can be utilized as an identifier of the crop model. Weather data 2044 is indicative of the weather at the time of the sensing. Weather data accuracy 2046 is indicative of the accuracy of the given weather data. Crop type 2048 is indicative of the type of crop sensed. Phenotype variation 2050 is indicative of the phenotype variation for the genotype of the given crop. Quality score 2052 is generated by model quality metric generator 248 and is indicative of the estimated quality of the prediction. Data attributes 2024 can include other items as well, as indicated by block 2054.

FIG. 2A also shows that work machine 100 can include one or more different processors 208, communication system 210, sensors 212 (which can include yield sensors 211, position/route sensors 157, speed sensors 147, and a wide variety of other sensors 214 (which can be those described above with respect to FIG. 1 or different ones), in situ data collection system 216, model generator system 218, model evaluation system 220, data store 222, control system 224, controllable subsystems 226, operator interface mechanisms 228, and it can include a wide variety of other items 230.

FIG. 2A shows that operator 232 can interact with operator interface mechanisms 228 in order to control and manipulate machine 100. Thus, operator interface mechanisms 228 can include such things as a steering wheel, pedals, levers, joysticks, buttons, dials, linkages, etc. In addition, they can include a display device that displays user actuatable elements, such as icons, links, buttons, etc. Where the display is a touch sensitive display, those user actuatable items can be actuated by touch gestures. Similarly, where mechanisms 228 include speech processing mechanisms, then operator 232 can provide inputs and receive outputs through a microphone and speaker, respectively. Operator interface mechanisms 228 can include any of a wide variety of other audio, visual or haptic mechanisms.

In situ data collection system 216 illustratively includes data aggregation logic 234, data measure logic 236, and it can include other items 238. Model generator system 218 illustratively includes a set of different model generation mechanisms 240-242 that may use different schemes to generate predictive models that can be used in controlling machine 100. For example, they may generate predictive models using a linear function, different functions, such as a curve, or they may be used to generate different types of predictive models, such as a neural network, a Bayesian model, etc. System 218 can include other items 244 as well.

Model evaluation system 220 illustratively receives one or more predictive models generated by model generator system 218 and evaluates the accuracy of that model. Thus, it includes model evaluation trigger 246, model quality metric generator 248, model evaluator logic 250 (which, itself, includes threshold logic 252, sorting logic 254, and other items 256), model selection logic 258, and it can include other items 260.

Evaluation trigger logic 246 detects an evaluation trigger which indicates that model evaluation system 220 is to evaluate the accuracy of one or more predictive models. Those models may be currently in use in controlling work machine 100, or they may be different models that are generated, as alternative models which may be used to replace the current model, if the alternate model is more accurate. Once triggered, model quality metric generator 248 illustratively generates a model quality metric for a model under analysis. An example may be helpful.

Assume that the predictive model generated by system 218 is a predictive yield model that predicts a yield at different locations in the field being harvested. Evaluation trigger logic 246 will be triggered based on any of a variety of different types of criteria (some of which are described below) so that model evaluation system 220 iteratively, and dynamically evaluates the accuracy of the predictive yield model, during the harvesting operation. In that case, model quality metric generator 248 will obtain actual yield data from yield sensors 211 and determine the accuracy of the predictive yield model that it is evaluating. Based on that accuracy, it generates an accuracy score or quality score. It can do this for one or more different models.

Model evaluator logic 250 then determines whether the model is qualified to be used in order to control machine 100. It can do this in a number of different ways. Threshold logic 252 can compare the model quality metric generated by generator 248 to a threshold to determine whether the model is performing (or will perform) adequately. Where multiple models are being evaluated simultaneously, sorting logic 254 can sort those models based upon the model quality metric generated for each of them. It can find the best performing model (for which the model quality metric is highest) and threshold logic 252 can then determine whether the model quality metric for that model meets the threshold value.

Model selection logic 258 then selects a model, where one is performing (or will perform) adequately based on the model quality metric and its evaluation. It provides the selected predictive model to control system 224 which uses that model to control one or more of the different controllable subsystems 226.

Thus, control system 224 can include feed rate control logic 262, settings control logic 264, route control logic 266, power control logic 268, and it can include other items 270. Controllable subsystems 226 can include propulsion subsystem 272, steering subsystem 274, one or more different actuators 276 that may be used to change machine settings, machine configuration, etc., power utilization subsystem 278, and it can include a wide variety of other systems 280, some of which were described above with respect to FIG. 1.

Feed rate control logic 262 illustratively controls propulsion system 272 and/or any other controllable subsystems 226 to maintain a relatively constant feed rate, based upon the yield for the geographic location that harvester 100 is about to encounter, or other characteristic predicted by the predictive model. By way of example, if the predictive model indicates that the predicted yield in front of the combine (in the direction of travel) is going to be reduced, then feed rate control logic 262 can control propulsion system 272 to increase the forward speed of work machine 100 in order to maintain the feed rate relatively constant. On the other hand, if the predictive model indicates that the yield ahead of work machine 100 is going to be relatively high, then feed rate control logic 262 can control propulsion system 272 to slow down in order to, again, maintain the feed rate at a relatively constant level.

Similarly, settings control logic 264 can control actuators 226 in order to change machine settings based upon the predicted characteristic of the field being harvested (e.g., based upon the predicted yield, or other predicted characteristic). By way of example, settings control logic 264 may actuate actuators 276 that change the concave clearance on a combine, based upon the predicted yield or biomass to be encountered by the harvester.

Route control logic 266 can control steering subsystem 274, also based upon the predictive model. By way of example, operator 232 may have perceived that a thunderstorm is approaching, and provided an input through operator interface mechanisms 228 indicating that operator 232 wishes the field to be harvested in a minimum amount of time. In that case, the predictive yield model may identify areas of relatively high yield and route control logic 266 can control steering subsystem 274 to preferentially harvest those areas first so that a majority of the yield can be obtained from the field prior to the arrival of the thunderstorm. This is just one example. In another example, it may be that the predictive model is predicting a soil characteristic (such as soil moisture, the presence of mud, etc.) that may affect traction. Route control logic 266 can control steering subsystems 274 to change the route or direction of work machine 100 based upon the predicted traction at different routes through the field.

Power control logic 268 can generate control signals to control power utilization subsystem 278 based upon the predicted value as well. For instance, it can allocate power to different subsystems, generally increase power utilization or decrease power utilization, etc., based upon the predictive model. These are just examples and a wide variety of other control signals can be used to control other controllable subsystems in different ways as well.

Figure 3A:
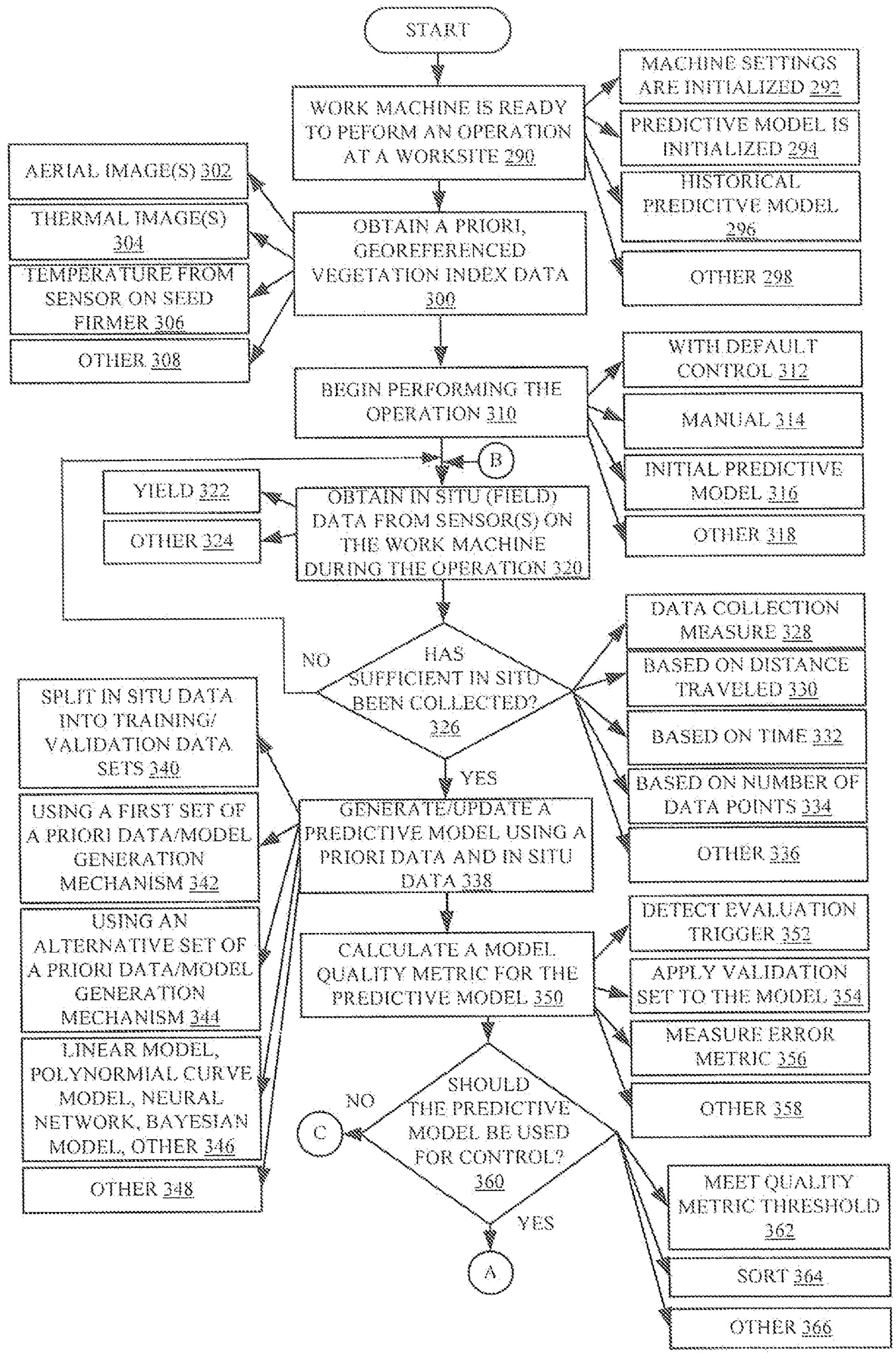
FIGS. 3A-3C (collectively referred to herein as FIG. 3) show a flow chart illustrating one example of the operation of the computing system architecture shown in FIG. 2.
Figure 3B:
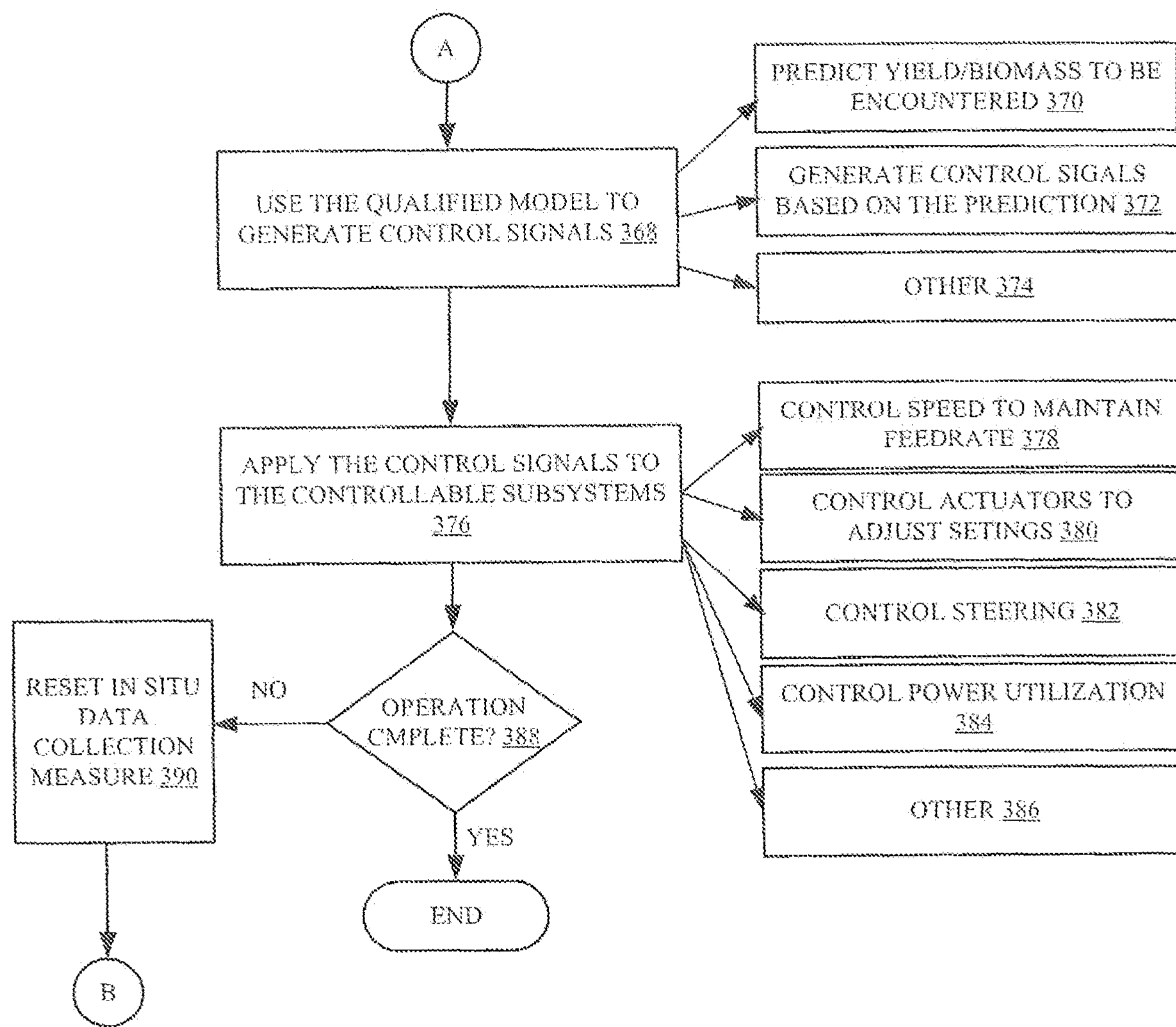
Figure 3C:
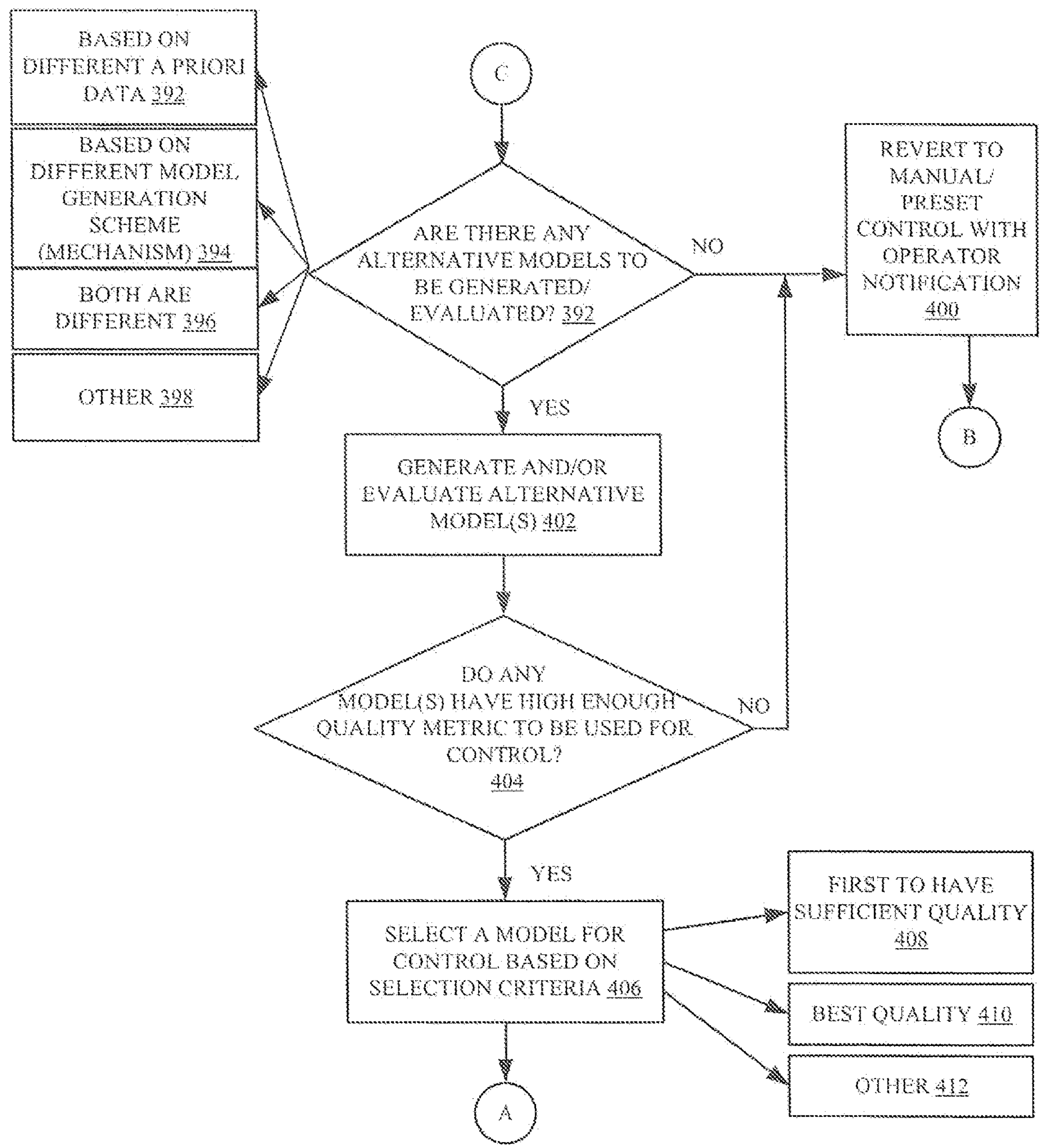

FIGS. 3A-3C (collectively referred to herein as FIG. 3) illustrate a flow diagram showing one example of the operation of architecture 180, shown in FIG. 2. It is first assumed that work machine 100 is ready to perform an operation at a worksite. This is indicated by block 290 in the flow diagram of FIG. 3. The machine can be configured with initial machine settings that can be provided by the operator or that can be default settings, for machine operation. This is indicated by block 292. A predictive model, that may be used for controlling work machine 100, may be initialized as well. In that case, the model parameters can be set to initial values or default values that are empirically determined or determined in other ways. Initializing the predictive model is indicated by block 294.

In another example, a predictive model can be used, during the initial operation of work machine 100 in the field, based upon historical use. By way of example, it may be that the last time this current field was harvested, with this crop type, a predictive model was used and stored. That model may be retrieved and used as the initial predictive model in controlling work machine 100. This is indicated by block 296. The work machine can be configured and initialized in a wide variety of other ways as well, and this is indicated by block 298. For example, the worksite may be field 530 in FIG. 4A discussed in more detail below.

Communication system 210 is illustratively a type of system that can be used to obtain a priori data over network 188 from a priori data store 186. It thus obtains a priori data which is illustratively georeferenced vegetation index data for the field that is being harvested (or that is about to be harvested). Obtaining the a priori data is indicated by block 300. The a priori data, as discussed above with respect to FIG. 2, can be generated from a wide variety of different types of data sources, such as from aerial images 302, thermal images 304, temperature from a sensor on a seed firmer that was used to plant the field, as indicated by block 306, or a wide variety of other data sources 308. For example, priori data can be the example data shown in FIG. 4B, discussed in more detail below.

Once the a priori data is obtained, it is provided to model generator system 218, and work machine 100 begins (or continues) to perform the operation (e.g., the harvesting operation). This is indicated by block 310. Again, control system 224 can begin to control controllable subsystems 226 with a default set of control parameters 312, under manual operation 314, using an initial predictive model (as discussed above) 316, or in other ways, as indicated by block 318.

As machine 100 is performing the operation (e.g., the harvesting operation) sensors 212 are illustratively generating in situ data (or field data) indicative of the various sensed variables, during the operation. Obtaining in situ (or field) data from sensors on work machine 100 during the operation is indicated by block 320 in the flow diagram of FIG. 3. In the example discussed herein, the in situ data can be actual yield data 322 generated from yield sensors 211. The yield sensors 211, as discussed above, may be mass flow sensors that sense the mass flow of grain entering the clean grain tank on machine 100. That mass flow can then be correlated to a geographic position in the field from which it was harvested, to obtain an actual yield value for that geographic position. Of course, depending upon the type of predictive model being generated, the in situ (or field) data can be any of a wide variety of other types of data 324 as well.

Before model generation system 218 can dynamically generate a predictive model (e.g., map) or before model evaluation system 220 can adequately evaluate the accuracy of a predictive model, sensors 212 must generate sufficient in situ field data to make the model generation and/or evaluation meaningful. Therefore, in one example, in situ data collection system 216 includes data aggregation logic 234 that aggregates the in situ data generated by, or based on, the output from sensors 212. Data measure logic 236 can track that data along various different criteria, to determine when the amount of in situ data is sufficient. This is indicated by block 326 in the flow diagram of FIG. 3. Until that happens, processing reverts to block 320 where machine 100 continues to perform the operation and data aggregation logic 234 continues to aggregate in situ (field) data based on the outputs from sensors 212 (and possibly other information as well). In one example, data measure logic 236 generates a data collection measure that may be indicative of an amount of in situ data that has been collected. This is indicated by block 328. By way of example, the particular type of predictive model that is being generated or evaluated may best be generated or evaluated after a certain amount of data has been generated. This may be indicated by the data collection measure 328.

Data measure logic 236 may measure the distance that machine 100 has traveled in the field, while performing the operation. This may be used to determine whether sufficient in situ (field) data has been aggregated, and it is indicated by block 330.

Data measure logic 236 may measure the amount of time that machine 100 is performing the operation, and this may give an indication as to whether sufficient in situ data has been obtained. This is indicated by block 332. Data measure logic 236 may quantify the number of data points that have been aggregated by data aggregation logic 234 to determine whether it is sufficient. This is indicated by block 334 in the flow diagram of FIG. 3. Determining whether sufficient in situ data has been collected can be determined in a wide variety of other ways as well, and this is indicated by block 336.

Once sufficient in situ data has been collected, it is provided to model generator system 218 (which has also received the a priori data). System 218 uses at least one of the model generation mechanisms 240-242 in order to generate a predictive model using the a priori data and the in situ data. This is indicated by block 338 in the flow diagram of FIG. 3. It will also be noted that, as discussed below, even after a predictive model has been generated and is being used to control work machine 100, it can be iteratively evaluated and updated (or refined) based upon the continued receipt of in situ data. Thus, at block 338, where a predictive model has already been generated, it can be dynamically and iteratively updated and improved.

In one example, the predictive model is generated by splitting the in situ data into training data and validation data sets. This is indicated by block 340. The training data, along with the a priori data can be supplied to a model generation mechanism (such as mechanism 240) to generate the predictive model. This is indicated by block 342. It will be noted that additional model generation mechanisms 242 can be used to generate alternate predictive models. Similarly, even the same model generation mechanism 240 that generated the predictive model under analysis can be used to generate alternate predictive models using a different set of a priori data. Using an alternate set of a priori data or an alternate model generation mechanism to generate alternate models is indicated by block 344.

The model generation mechanisms 240-242 can include a wide variety of different types of mechanisms, such as a linear model, polynomial curve model, neural network, Bayesian model, or other models. This is indicated by block 346. The predictive model can be generated and/or dynamically updated in a wide variety of other ways as well, and this is indicated by block 348.

Once a predictive model has been generated or updated, model evaluation system 220 evaluates that model by generating a model quality metric for the predictive model. This is indicated by block 350 in the flow diagram of FIG. 3. By way of example, evaluation trigger logic 246 can detect an evaluation trigger indicating that a model is to be evaluated. This is indicated by block 352. For example, evaluation system 220 may be triggered simply by the fact that model generator system 218 provides a predictive model to it for evaluation. In another example, a predictive model may already be in use in controlling work machine 100, but it is to be evaluated intermittently or periodically. In that case, if the interval for evaluation has passed, this may trigger evaluation trigger logic 246. In yet another example, it may be that a predictive model is currently being used to control work machine 100, but a number of different alternate models have also been generated and are now available for evaluation. In that case, the alternate models can be evaluated to determine whether they will perform better than the predictive model currently in use. This may be a trigger for evaluation trigger logic 246 as well. Model evaluation can be taking place continuously, during operation, as well.

In another example, the evaluation trigger can be detected, indicating that a predictive model is to be evaluated, based upon the presence of an aperiodic event. For instance, it may be that operator 232 provides an input indicating that the operator wishes to have an alternate model evaluated. Similarly, it may be that model generator system 218 receives new a priori data, or a new model generation mechanism. All of these or other events may trigger model evaluation system 220 to evaluate a predictive model. Similarly, even though the current predictive model may be operating sufficiently, an alternate model interval may be set at which available alternate models are evaluated to ensure that the model currently being used is the best one for controlling machine 100. Thus, when the alternate model evaluation interval has run, this may trigger the model evaluation logic to evaluate a new model as well.

In order to calculate a model quality metric for the predictive model under analysis, model quality metric generator 248 illustratively applies the in situ validation data set to the model under analysis. This is indicated by block 354. It then illustratively generates an error metric that measures the error of the model. This is indicated by block 356. In one example, the error metric is the $r^2$ error metric that measures the square of the error of the model. The model quality metric for the predictive model under analysis can be generated using a wide variety of quality metric mechanisms as well. This is indicated by block 358. For example, the rules in FIG. 4C can be utilized to determine the quality score. FIG. 4C is discussed in more detail below.

Once the model quality metric has been generated for the predictive model under analysis, the model evaluator logic determines whether that model should be used for controlling machine 100. This is indicated by block 360. For example, threshold logic 252 can determine whether the model quality metric meets a threshold value. This is indicated by block 362. The threshold value may be set based on factors such as the particular application in which machine 100 is being used, historical experience, etc. In one example where the $r^2$ value is used as the quality metric, a threshold of 0.7 or above may be used. This is just one example, and the threshold can be less than or greater than 0.7 as well.

Where multiple different predictive models have been generated, sorting logic 254 can sort the models based upon the quality metric. A decision as to whether the model under analysis should be used can be based on its rank in the sorted list of models. This is indicated by block 364. Model evaluator logic 250 can determine whether the model under analysis is to be used in other ways as well, and this is indicated by block 366.

If, at block 360, it is determined that the model under analysis is to be used, then model selection logic 258 selects that model and provides it to control system 224 for use in controlling machine 100. Control system 224 then generates control signals to control one or more controllable subsystems 226, using the qualified model. This is indicated by block 368 (FIG. 3B) in the flow diagram of FIG. 3. By way of example, the predictive model may be used to predict yield or biomass or other characteristics to be encountered by work machine 100. This is indicated by block 370. The various different type of logic in control system 224 can generate control signals based upon the prediction provided by the predictive model. This is indicated by block 372. The qualified model can be used to generate control signals in a wide variety of other ways as well, and this is indicated by block 374.

The control signals are then applied to one or more of the controllable subsystems in order to control machine 100. This is indicated by block 376 in the flow diagram of FIG. 3. For example, as discussed above, feed rate control logic 262 can generate control signals and apply them to propulsion system 272 to control the speed of machine 100 to maintain a feed rate. This is indicated by block 378. Settings control logic 264 can generate control signals to control settings actuators 276 to adjust the machine settings or configuration. This is indicated by block 380. Route control logic 266 can generate control signals and apply them to steering subsystem 274 to control steering of machine 100. This is indicated by block 382. Power control logic 268 can generate control signals and apply them to power utilization subsystem 278 to control power utilization of machine 100. This is indicated by block 384. A wide variety of other control signals can be generated and applied to a wide variety of other controllable subsystems to control machine 100 as well. This is indicated by block 386.

Unless the operation is complete, as is indicated by block 388, in situ data collection system illustratively resets the in situ data collection measure generated by data measure logic 236 so that it can be determined whether a sufficient amount of in situ data has been collected in order to re-evaluate the current model (or a different model). Resetting the in situ data collection measure is indicated by block 390 in the flow diagram of FIG. 3. As discussed above, even where a current model has been evaluated and is sufficiently accurate to control work machine 100, that same model is iteratively evaluated and refined, as more in situ (field) data is obtained. As the field conditions change, it may be that the model is no longer as accurate as it was initially. Thus, it is iteratively and dynamically evaluated, while machine 100 is performing the operation, to ensure that it is accurate enough to be used in control of machine 100. Thus, once the in situ data collection measure is reset at block 390, processing reverts to block 320 where data aggregation logic 234 continues to aggregate in situ data until enough has been aggregated to perform another evaluation or model generation step.

Returning again to block 360 in FIG. 3, if model evaluation system 220 determines that the predictive model under analysis is not of high enough quality to be used by control system 224 in controlling machine 100, then this triggers evaluation trigger logic 246 to determine whether there are any alternate models that may be generated, or evaluated, to determine whether they should be used, instead of the model that was just evaluated. Determining whether there are any other models is indicated by block 392 (FIG. 3C) in the flow diagram of FIG. 3. Again, an alternate model may be generated or available because different a priori data (e.g., alternate a priori data 204) has been received so that an alternate model can, or already has been, generated. This is indicated by block 392. In addition, it may be that a different model generation mechanism 240-242 can be used (even on the same a priori data as was previously used) to generate an alternate model that can be evaluated. This is indicated by block 394.

In another example, it may be that both a new model generation mechanism has been received, and new a priori data has been received, so that an alternate model can be generated (or already has been generated) using the new mechanism and new a priori data. This is indicated by block 396 in the flow diagram of FIG. 3. Determining whether there are any alternative models to be generated or evaluated can be done in a wide variety of other ways as well, and this is indicated by block 398.

If, at block 392, it is determined that there are no alternative models to generate or evaluate, then model evaluation logic 220 indicates this to operator interface mechanisms 228 and a message is displayed to operator 232 indicating that control of machine 100 is reverting to manual or preset control. In that case, control system 224 receives control inputs from operator 232 through operator interface mechanisms 228, or it can receive preset inputs or it can revert to control using a default model. This is all indicated by block 400 in the flow diagram of FIG. 3.

However, if, at block 392, it is determined that there are alternate models that can be generated or that have been generated and are ready for evaluation, then processing proceeds at block 402 where one or more of the alternate models are generated and/or evaluated to determine whether they are of sufficient quality to be used in work machine 100. The evaluation can be done as described above with respect to figures 338-360 in the flow diagram of FIG. 3.

Model selection logic 258 then determines whether any of the models being evaluated have a high enough quality metric to be used for controlling machine 100. This is indicated by block 404. If not, processing reverts to block 400. It should also be noted that, in one example, multiple alternate models are all evaluated substantially simultaneously. In that case, model selection logic 258 can choose the best alternate model (assuming that its quality is good enough) for controlling machine 100. In another example, only one alternate model is evaluated at a given time.

In either example, if, at block 404, model evaluator logic 250 identifies a model that has a high enough quality metric for controlling machine 100, then model selection logic 258 selects that model for control based upon the selection criteria. This is indicated by block 406. Again, where multiple models are being evaluated, model selection logic 258 may simply select the first model that has a quality metric above a threshold value. This is indicated by block 408. In another example, sorting logic 254 can sort all of the models being evaluated based upon their quality metric, and model selection logic 258 can select the model with the best quality metric value. This is indicated by block 410. The model can be selected in other ways as well, and this is indicated by block 412. Once the model is selected, processing proceeds at block 368 where that model is used to generate control signals for controlling machine 100.

Thus far in the description, it has been assumed that one predictive model is used by control system 224 to control the controllable subsystems 226. However, it may be that different predictive models are used by control system 224 to control different controllable subsystems. In addition, it may be that the outputs of a plurality of different predictive models are used to control a plurality of different controllable subsystems. Similarly, it may be that the models are specific to a given actuator or set of actuators. In that example, a predictive model may be used to generate control signals to control a single actuator or a set of actuators.

Figure 4A:
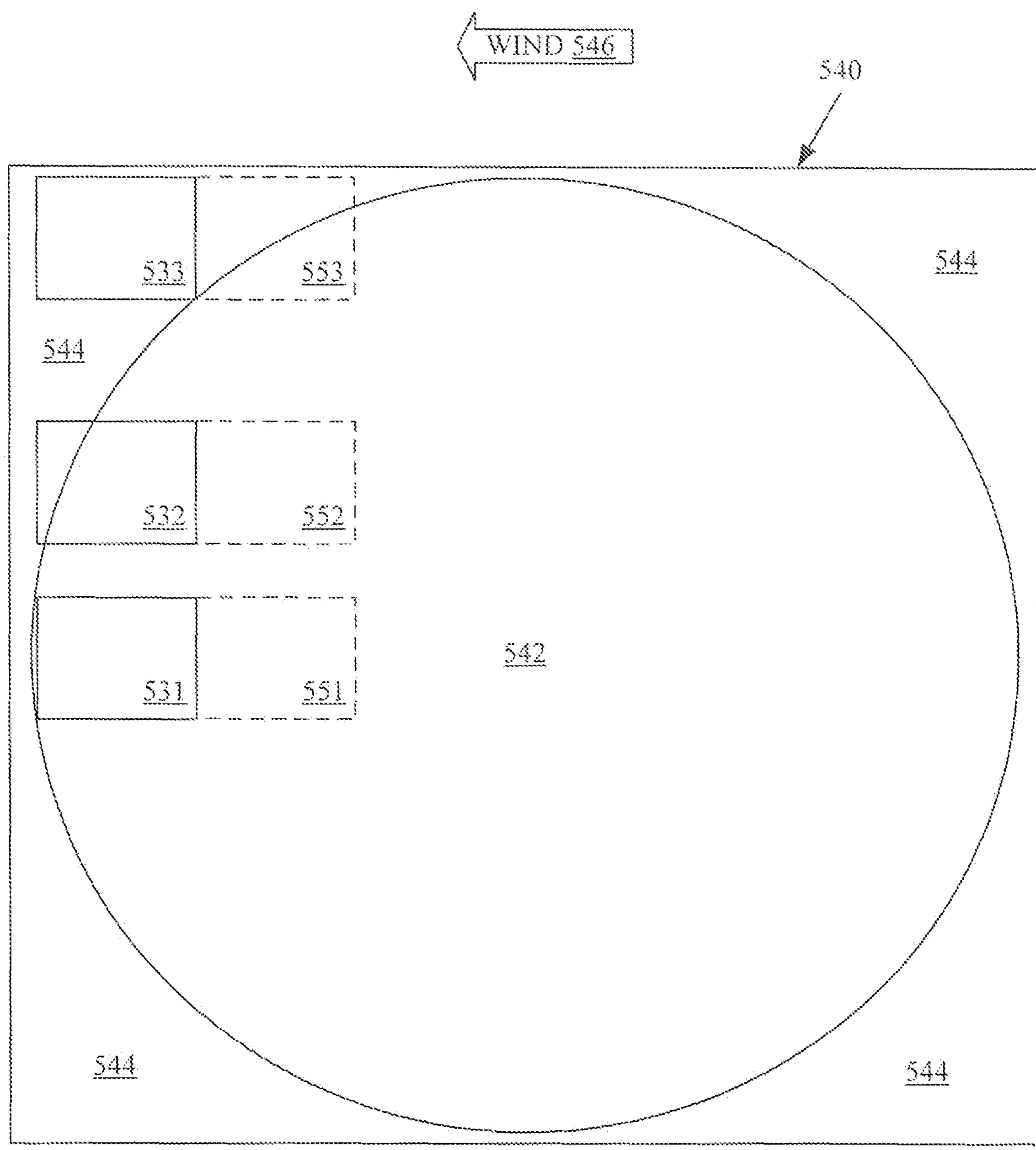
FIG. 4A is a diagram showing one example field.

FIG. 4A is a diagram showing one example field 540 where a harvesting operation is being performed by a machine such as machine 100, discussed above. As shown, field 540 includes irrigated section 542 and unirrigated sections 544. In this example, assume that rainfall was sufficient through vegetation stage 12 (V12) for unharvested crop, which was corn, such that irrigation was not required. During grain fill, it became very dry which reduced yield and caused dusty conditions when wind 546 had high speed at harvest time.

Field 540 includes portion 531, entirely within irrigated section 542; portion 533, entirely within unirrigated section 544, and portion 532 which is partially in irrigated section 542 and partially in unirrigated section 544. The width of portions 531, 532, and 533 are approximately the same as the width of header 102 of mobile machine 100.

Portions 531, 532, and 533 have adjacent portions 551, 552, and 553 which were previously harvested by mobile machine 100.

Portions 531, 532, and 533 have georeferenced predictions (shown in FIG. 4B) 511*a-d*, 512*a-d*, and 533*a-d*, respectively. These georeferenced predictions may present in data store 186, for example. The different georeferenced predictions in FIG. 4B will now be discussed.

Georeferenced Predictions 511*a*, 512*a*, and 513*a* are made based on NDVI images. In one example, the NDVI images have the following attributes. The temporal location of the NDVI image is Jul. 15, 2020 when the crop was at growth stage V12. The resolution of the NDVI images is 2 $cm^2$ pixels, 5 cm pixel location accuracy, and 1 cm pixel location precision.

A correlation exists between an NDVI image taken at V12 and harvested yield. While the spatial resolution is good, the time between when the NDVI image was captured (before the draught) and when it was used to estimate yield (harvest after the drought) is poor. The NDVI data used to generate the yield estimate was captured before the moisture stress (drought) and thus the predicted yield is similar for the three portions 531, 532 and 533. Therefore, in this example, the drought conditions impacting yield of unirrigated crop in unirrigated section 544 is not reflected in by the NDVI image because it was taken so early.

Georeferenced Predictions 511*b*, 512*b*, and 513*b* are made based on signals generated by per-plant corn stalk diameter sensors on combine header 102. In one example, the corn stalk diameter sensors have the following attributes. The temporal location is Oct. 15, 2020 (e.g., real-time during harvest). The diameter accuracy and diameter precision of the sensor is 2 mm and 1 mm, respectively.

A correlation exists between stalk diameter and yield. The accuracy of this approach can suffer in weedy areas when weeds can confound the stalk identification and measurement. It may also be less accurate when yield is limited in the reproductive vs vegetative stage.

Georeferenced predictions 511*c*, 512*c* and 513*c* are predicted based on the yield from an adjacent pass of combine 100. In one example, the yield from an adjacent pass of a combine has the following attributes. The temporal location is Oct. 15, 2020 (e.g., real-time during harvest). The spatial accuracy, location accuracy and location precision are 3 m, 10 cm and 1 cm, respectively.

Georeferenced predictions 511*d*, 512*d*, and 513*d* are predicted based on a forward-looking camera on the combine 100. In one example, the forward-looking camera has the following attributes. The temporal location is Oct. 15, 2020 (e.g., real-time during harvest). The pixel area, location accuracy and location precision are 5 $cm^2$, 4 cm and 1 cm, respectively.

An example analysis accomplished by model quality generator 248 and/or model selection logic 258 is provided below for each of portions 531, 532 and 533. The below examples are described with respect to the example quality rules in FIG. 4C. Note that the quality rules in FIG. 4C are examples only and different rules may also be applied.

Predictions about portion 531 in FIG. 4A are shown in FIG. 4B as predictions 511*a*, 511*b*, 511*c*, and 511*d*. For the NDVI-based prediction 511*a*, none of the rules in FIG. 4C apply because portion 531 has been fully irrigated. Therefore, model quality generator 248 determines that this quality score is high. For the stalk diameter prediction 511*b* none of the rules in FIG. 4C apply because portion 531 has no weeds (e.g., as determined by an aerial image and/or scouting). Therefore, model quality generator 248 determines that this prediction quality score is high. For the adjacent pass prediction 511*c* none of the rules in FIG. 4C apply because portion 531 is entirely irrigated and adjacent portion 551 is also entirely irrigated so similitude in yields for all predictions should be high. Accordingly, model quality generator 248 determines the quality score to be high. For the forward-looking prediction 511*d*, none of the rules in FIG. 4C apply because there is good soil moisture (e.g., due to known irrigation or rainfall and/or because the moisture is sensed) meaning that little to no airborne dust is present. Therefore, model quality generator 248 determines this quality score to be high. In some examples, an obscurant sensor is also used to check if airborne dust or another obscurant is present.

Given the above analysis, all quality scores of predictions for portion 531 are set to high by model quality generator 248 per rule 1 of FIG. 4C. Per rule 2 of FIG. 4C, model selection logic 258 should average the predictions with high quality scores to obtain the value to be used (e.g., 200+205+200+190)/4=199 bu/acre to be the prediction value used). This prediction is passed to control system 224 which will set components of machine 100 to optimally process crop having a yield of 199 bu/acre when machine 100 is travelling through portion 531.

Predictions about portion 532 in FIG. 4A are shown in FIG. 4B as predictions 512*a*, 512*b*, 512*c*, and 512*d*. For the NVDI-based prediction 512*a*, model selection logic 258 applies rule 6 of FIG. 4C because portion 532 has only been partially irrigated since the V12 NDVI image was captured and there has been some yield loss due to water stress. Accordingly, model selection logic 258 gives this prediction a medium score. For the stalk-based prediction 512*b*, model selection logic 258 applies rule 7 of FIG. 4C because crop scouting has shown this portion to be somewhat weedy. Accordingly, model selection logic 258 determines this quality should be medium. For the adjacent pass prediction 512*c*, model selection logic 258 applies rule 9 of FIG. 4C, because portion 532 is partially irrigated and the adjacent portion 552 is fully irrigated. Therefore, model quality metric generator 248 determines prediction 512*c* has a quality metric of medium. For the forward-looking prediction 512*d*, none of the rules in FIG. 4C apply because there is good soil moisture (e.g., due to known irrigation or rainfall and/or sensed moisture) meaning that little to no airborne dust is present. Therefore, model quality generator 248 determines this quality score to be high.

Since there is only one georeferenced prediction for portion 532 with a high quality score, the forward looking yield prediction 512*d* of 175 bu/acre is the prediction selected by model selection logic 258 and is passed to control system 224. This prediction is passed to control system 224 which will set components of machine 100 to optimally process crop having a yield of 175 bu/acre when machine 100 is travelling through portion 531.

Predictions about portion 533 in FIG. 4A are shown in FIG. 4B as predictions 513*a*, 513*b*, 513*c*, and 513*d*. For the NVDI-based prediction 513*a*, model selection logic 258 applies rule 5 of FIG. 4C because portion 533 lies entirely in unirrigated section 544. There has been significant yield loss from moisture stress since the V12 NDVI yield prediction was generated. Accordingly, model selection logic 258 gives this prediction a low score. For the stalk-based prediction 512*b*, model selection logic 258 applies rule 11 of FIG. 4C because the portion had adequate moisture during the vegetative stages. Stalk diameter was not impacted by later drought during grain filling which reduced yield. Accordingly, model selection logic 258 determines this quality should be low. For the adjacent pass prediction 512*c*, model selection logic 258 applies rule 9 of FIG. 4C, because portion 533 is entirely unirrigated and the adjacent portion 553 is partially irrigated. Therefore model quality metric generator 248 determines prediction 513*c* has a quality metric of medium. For the forward-looking prediction 513*d*, model selection logic 258 applies rule 9 of FIG. 4C, because portion 533 has been unirrigated, soil is dusty and wind 546 can kick up dust which obscures the forward-looking camera. Accordingly, model quality metric generator 248 determines prediction 513*d* has a quality metric of low.

Since the highest georeferenced prediction for portion 533 is prediction 513*c* with a medium quality score, the adjacent pass prediction 513*c* of 150 bu/acre is the prediction selected by model selection logic 258. This prediction is passed to control system 224 which will set components of machine 100 to optimally process crop having a yield of 150 bu/acre when machine 100 is travelling through portion 533.

Figure 5:
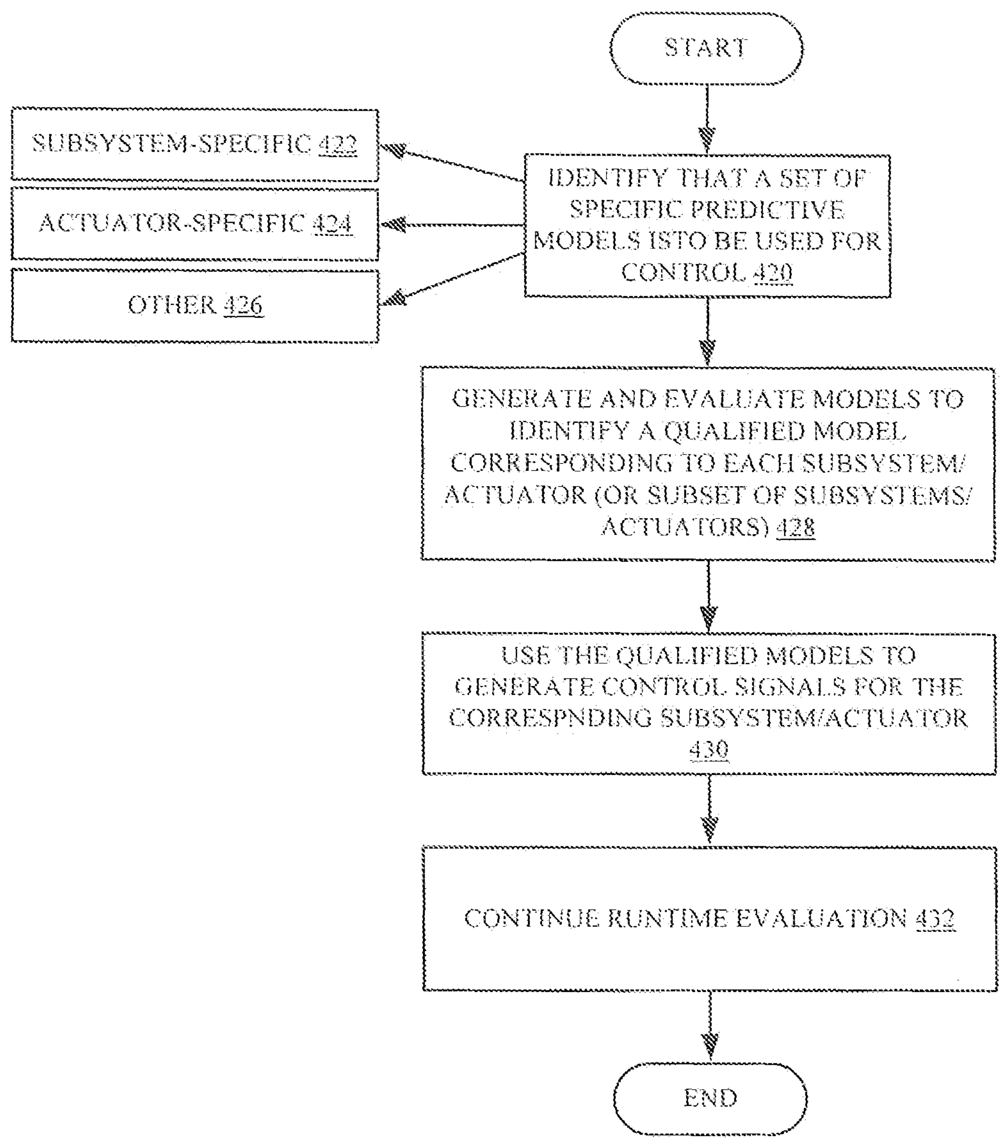
FIG. 5 is a flow chart illustrating another example of the operation of the architecture illustrated in FIG. 2, dynamically generating actuator-specific or subsystem-specific control models.

FIG. 5 is a flow diagram illustrating one example of the operation of architecture 180 in an example where multiple different predictive models are used to control different controllable subsystems. It is thus first assumed that model generator system 218 identifies that a set of specific predictive models is to be used for controlling machine 100, instead of a single predictive model. This is indicated by block 420 in the flow diagram of FIG. 5. The predictive models may be subsystem-specific models so that a different predictive model is used to control each of the different controllable subsystems 226. This is indicated by block 422 in the flow diagram of FIG. 5. They may be actuator-specific models so that a different predictive model is used by control system 224 to control a different actuator or set of actuators. This is indicated by block 424. The models may be configured in other ways, so that, for instance, the output of a plurality of a different models is used to control a single subsystem, or so that a single model is used to control a subset of the controllable subsystems while another model is used to control the remaining controllable subsystems, or a different subset of those subsystems. Identifying the set of specific predictive models in other ways is indicated by block 426 in the flow diagram of FIG. 5.

In that example, model generator system 218 then generates a set of specific predictive models to be evaluated, and model evaluation system 220 evaluates those specific predictive models. Model evaluation system 220 illustratively identifies a qualified model corresponding to each subsystem/actuator (or subset of the subsystems/actuators) on work machine 100. This is indicated by block 428 in the flow diagram of FIG. 5.

Model selection logic 258 selects a model for each of the systems/actuators and provides it to control system 224. Control system 224 uses the qualified models to generate signals for the corresponding subsystems/actuator (or subset of subsystems/actuators). This is indicated by block 430 in the flow diagram of FIG. 5.

By way of example, it may be that the traction in the field is modeled by a predictive model. The output of that model may be used by control system 224 to control the steering subsystem 274 to steer around muddy or wet areas where traction is predicted to be insufficient. The in situ data, in that case, may be soil moisture data which is sensed by a soil moisture sensor on machine 100 and provided as the actual, in situ, field data for the predictive traction model. In another example, the header lift actuator may be controlled by a separate predictive model that predicts topography. The in situ data may indicate the actual topography over which machine 100 is traveling. Of course, there are a wide variety of other types of predictive models that can be used by control system 224 to control individual actuators, sets of actuators, individual subsystems, sets of subsystems, etc.

As with the single model example discussed above with respect to FIG. 3, each of the plurality of different predictive models will illustratively be dynamically and iteratively evaluated. Similarly, they can each be replaced by an alternate model, if, during the evaluation process, it is found that an alternate model performs better. Thus, in such an example, multiple predictive models are continuously, dynamically, and iteratively updated, improved, and evaluated against alternate models. The models used for control can be swapped out with alternate models, based upon the evaluation results, in near real time, during operation of the work machine in the field. Continuing the runtime evaluation, in this way, is indicated by block 432 in the flow diagram of FIG. 5.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
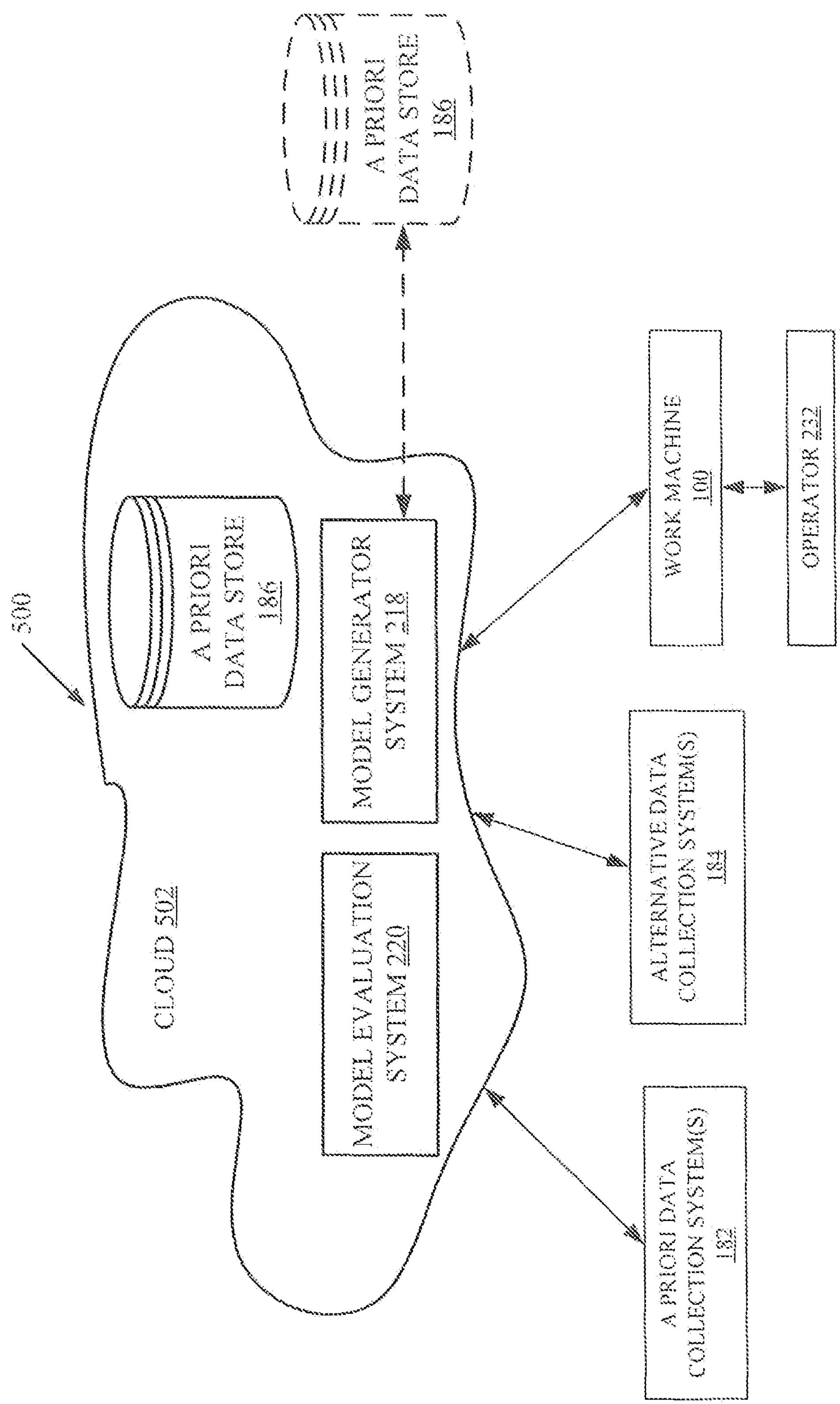
FIG. 6 is a block diagram showing one example of the architecture illustrated in FIG. 2A, deployed in a remote server architecture.

FIG. 6 is a block diagram of harvester 100, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIG. 2 and they are similarly numbered. FIG. 6 specifically shows that model generation system 218, model evaluation system 220 and a priori data store 186 can be located at a remote server location 502. Therefore, harvester 100 accesses those systems through remote server location 502.

FIG. 6 also depicts another example of a remote server architecture. FIG. 6 shows that it is also contemplated that some elements of FIG. 2 are disposed at remote server location 502 while others are not. By way of example, data store 186 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester or transfers information to the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send and receive the information to/from the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
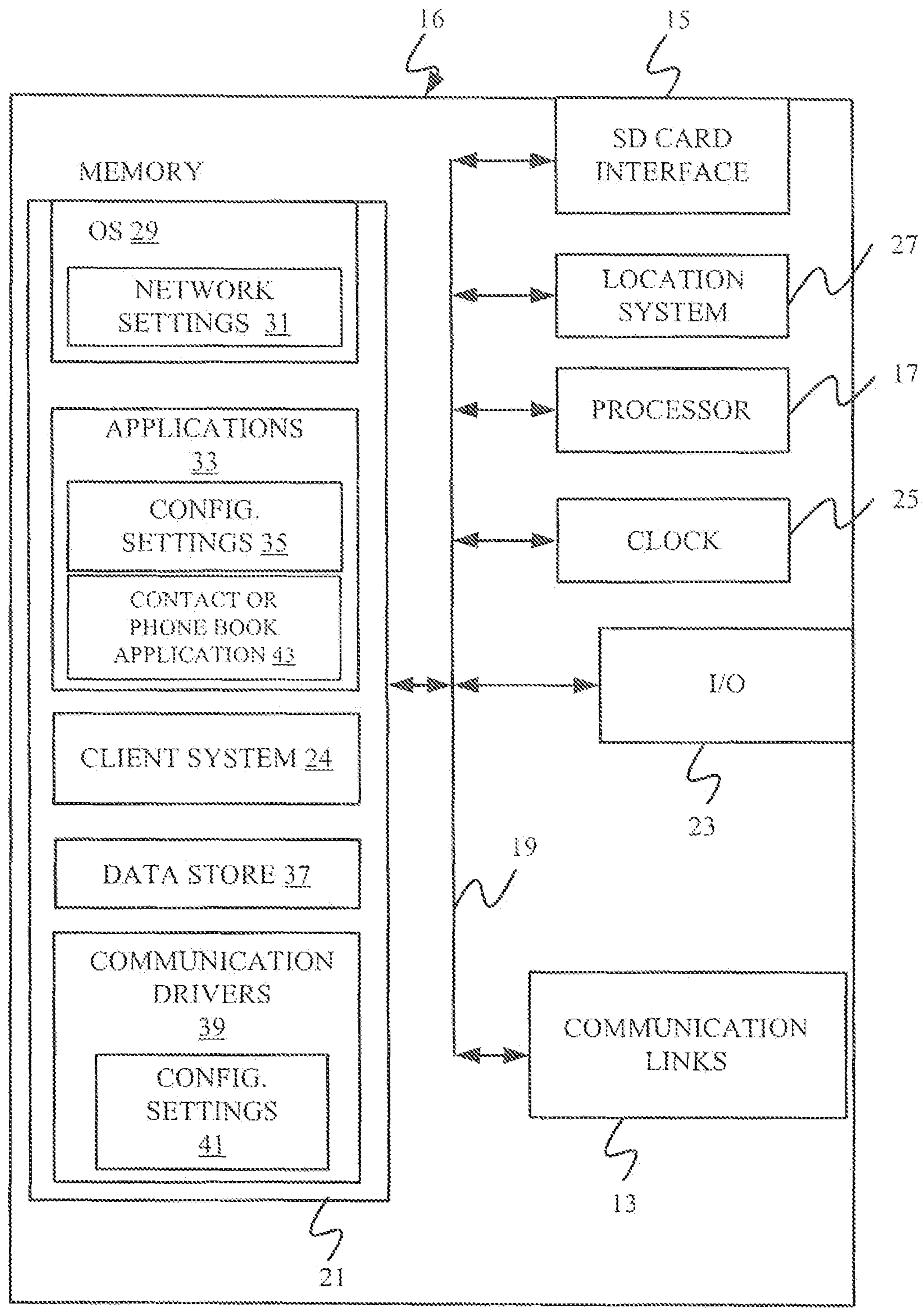
FIGS. 7-9 show examples of mobile devices that can be used in the architectures shown in the previous figures.
Figure 8:
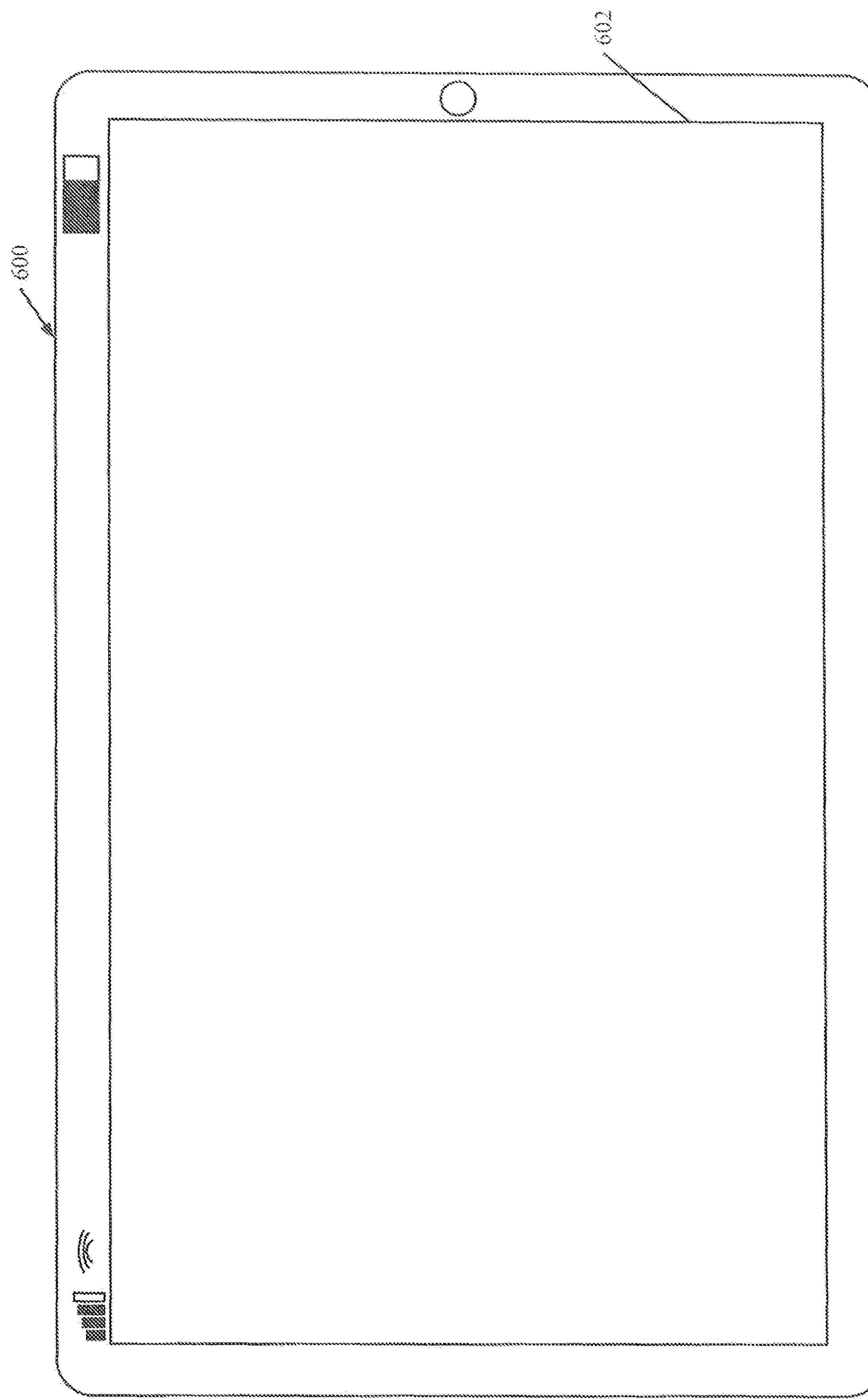
Figure 9:
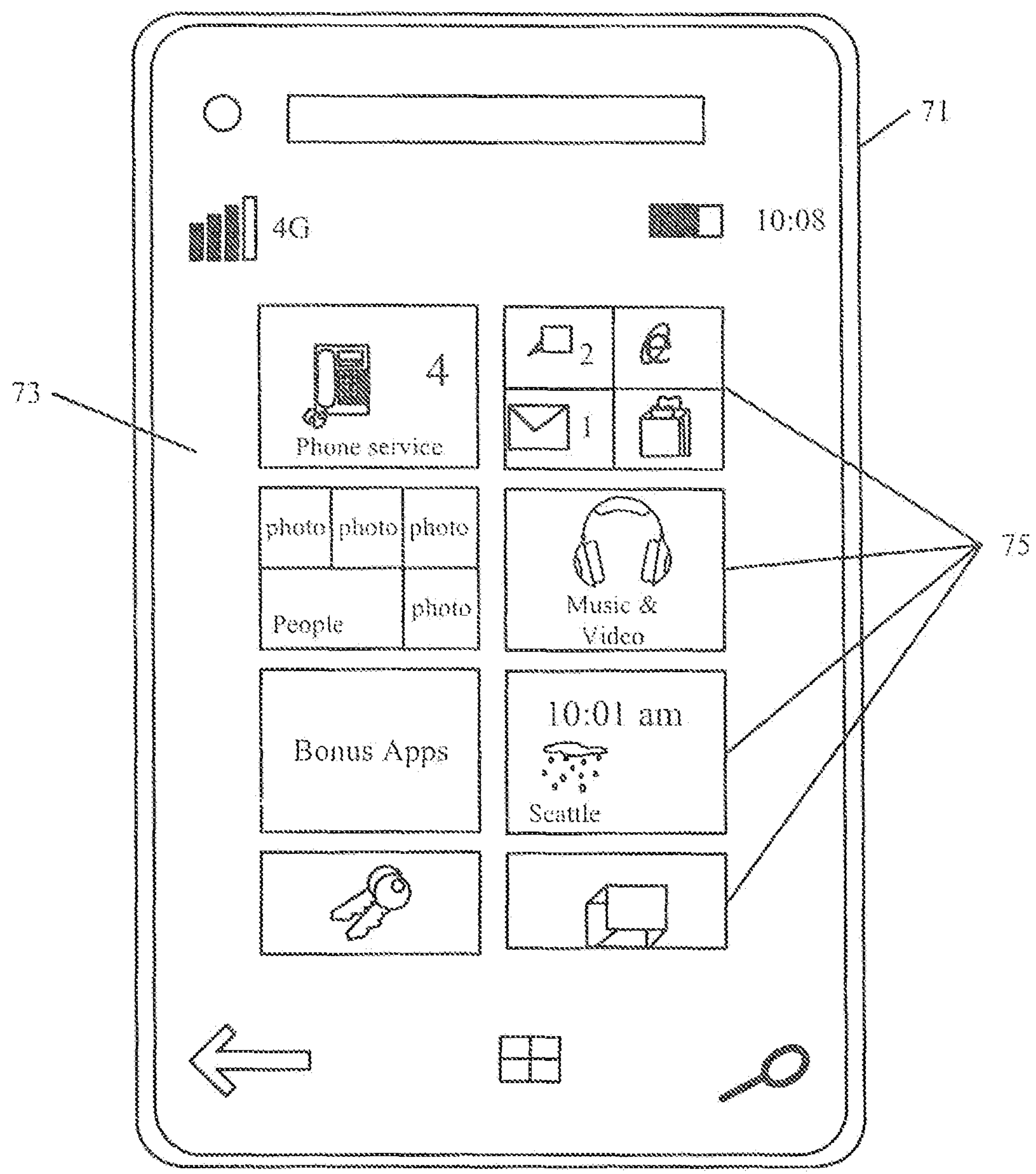

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the stool width and position data. FIGS. 8-9 are examples of handheld or mobile devices.

FIG. 7 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and nonvolatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
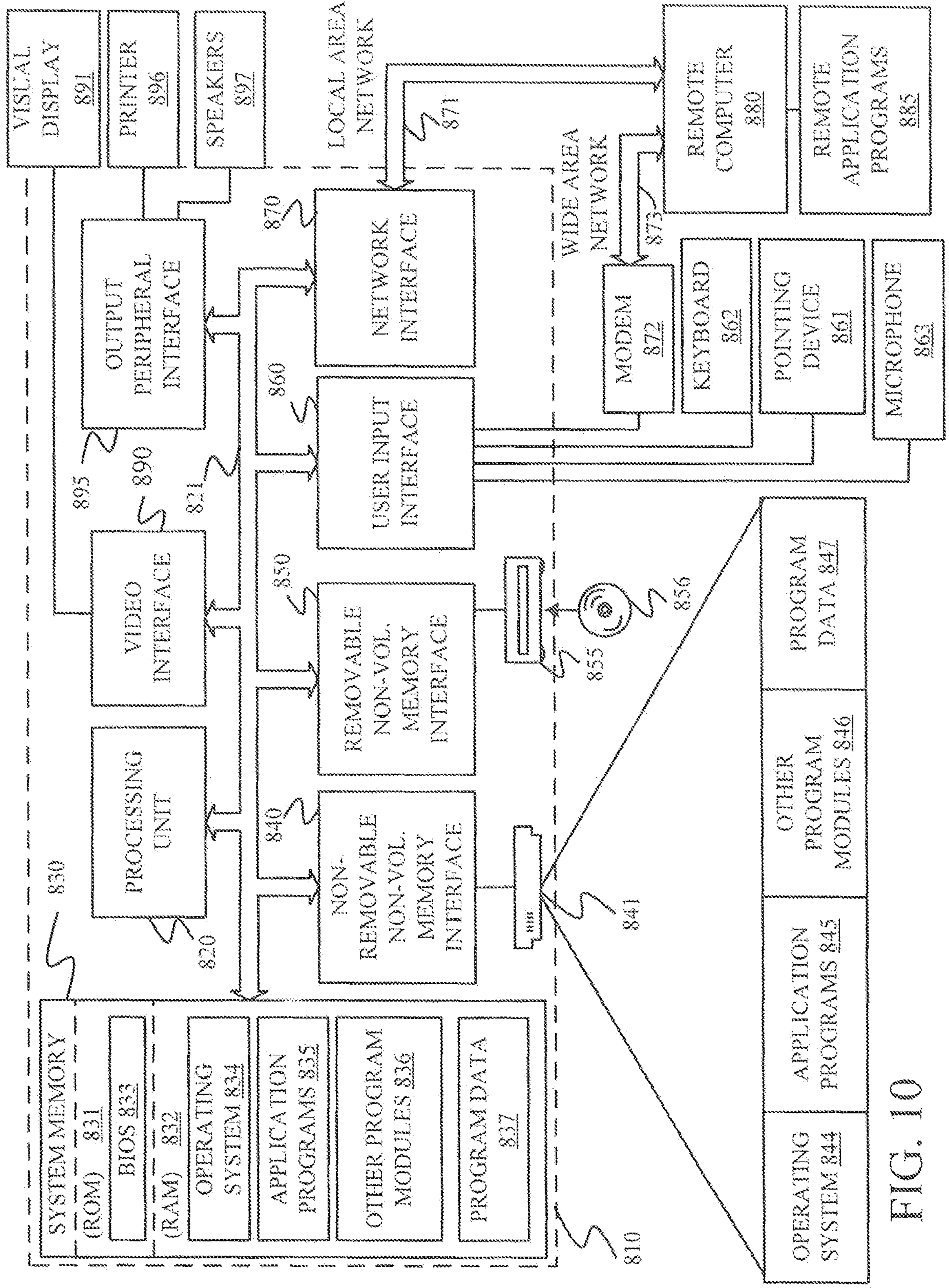
FIG. 10 is a block diagram showing one example of a computing environment that can be used in the architectures shown in the previous figures.

FIG. 10 is one example of a computing environment in which elements of FIG. 2, or parts of it, (for example) can be deployed. With reference to FIG. 10, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term “modulated data signal” means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a method of controlling a machine on a worksite to perform an operation, comprising:

identifying georeferenced data for the worksite that was generated prior to the machine performing the operation at the worksite;

collecting field data, with a sensor on the machine, as the machine is performing an operation at the worksite, the field data corresponding to a portion of the worksite;

generating a first predictive model based on the georeferenced data and a second predictive model based on the field data;

calculating a first model quality metric, for the first predictive model, indicative of model accuracy;

calculating a second model quality metric, for the second predictive model, indicative of model accuracy;

selecting one of the first model and the second model as a selected model, based on the calculated first quality metric and second quality metric; and controlling a subsystem of the machine, using the selected model, to perform the operation.

Example 2 is the method of any or all previous examples wherein selecting the selected model comprises:

determining whether the first model quality metric and second model quality metric meet a model quality threshold.

Example 3 is the method of any or all previous examples wherein selecting the selected model comprises:

comparing the first quality metric and the second quality metric; and selecting the first model or the second model based on the comparison between the first quality metric and second quality metric.

Example 4 is the method of any or all previous examples wherein identifying georeferenced data comprises:

obtaining a priori georeferenced vegetative index data, from a remote system, corresponding to the worksite.

Example 5 is the method of any or all previous examples wherein collecting field data comprises:

obtaining stalk diameter data corresponding to a portion of the worksite, with a stalk diameter sensor on the machine, as the machine is performing a harvesting operation at the worksite.

Example 6 is the method of any or all previous examples wherein the machine has a plurality of different subsystems and wherein controlling a subsystem comprises:

controlling the plurality of different subsystems on the machine.

Example 7 is the method of any or all previous examples wherein generating the first model quality metric comprises:

retrieving weather data; and generating the first model quality metric based, at least in part, on the weather data.

Example 8 is the method of any or all previous examples wherein calculating the second model quality metric comprises:

collecting field obscurant data with an obscurant sensor; and generating the second model quality metric based, at least in part, on the field obscurant data.

Example 9 is the method of any or all previous examples further comprising:

if the first model quality metric and the second model quality metric both meet the model quality threshold, then controlling each of the different subsystems of the work machine on the worksite, using a different one of the plurality of different predictive models.

Example 10 is the method of any or all previous examples wherein calculating the model quality metric comprises:

calculating an error value indicative of model error based on a comparison of model values from the generated predictive model to field values in the collected field data.

Example 11 is the method of any or all previous examples and further comprising:

iteratively repeating steps of collecting field data, updating the predictive model based on the field data, calculating a model quality metric for the updated predictive model and determining whether the predictive model is a qualified predicative model, while the machine is performing the operation.

Example 12 is a computing system on a work machine, comprising:

a communication system configured to identify a priori, georeferenced vegetative index data for a worksite;

an in situ data collection system that collects field data, with a sensor on a machine, as the machine is performing an operation at the worksite, the field data corresponding to a portion of the worksite;

a model generator system configured to receive the a priori, georeferenced vegetative index data and field data and generate a first predictive model based on the a prior georeferenced vegetative index data and a second predictive model based on the field data; and a model evaluation system configured to calculate a first model quality metric for the first predictive model and a second model quality metric for the second predictive model, and determine whether the first and second predictive models are qualified predictive model; and a control system that, if one of the first and second predictive models is a qualified predictive model, controls a subsystem of the machine using the qualified predictive model.

Example 13 is the computing system of any or all previous examples wherein the model evaluation system comprises:

a model quality metric generator configured to calculate the model quality metric for the predictive model based on a set of model quality rules.

Example 14 is the computing system of any or all previous examples wherein the model evaluation system comprises:

evaluation trigger logic configured to detect an evaluation trigger and, in response, generate a trigger output for the model evaluation system to evaluate an alternative predictive model.

Example 15 is the computer system of any or all previous examples wherein the model generation system is configured to, in response to the trigger output, generate the alternative predictive model using alternative a priori data for the worksite.

Example 16 is the computer system of any or all previous examples wherein the model generation system is configured to, in response to the trigger output, generate the alternative predictive model using an alternative model generation mechanism.

Example 17 is the computing system of any or all previous examples wherein the model generator system is configured to generate the first predictive model and the second predictive model as corresponding to a specific controllable subsystem, and wherein the control system uses each of the predictive models to control the corresponding specific controllable subsystem.

Example 18 is the computing system of any or all previous examples wherein the model quality metric generator is configured to calculate the model quality metric by calculating an error vector based on values generated by the predictive model and actual values in the collected field data.

Example 19 is a work machine, comprising:

a communication system configured to receive georeferenced data for a worksite;

an in situ data collection system configured to collect field data, with a sensor on a machine, as the machine is performing an operation at the worksite, for a portion of the worksite;

a plurality of controllable subsystems;

a model generator system configured to generate a plurality of different predictive models, based on the georeferenced data and the field data, each corresponding to a different controllable subsystem of the plurality of controllable subsystems of the work machine;

a model evaluation system configured to calculate a model quality metric for each of the predictive models, based on a set of model quality rules and determine whether each of the predictive models is a qualified predictive model based on the model quality metrics; and a control system that generates control signals to control each of the controllable subsystems using a corresponding qualified predictive model.

Example 20 is the work machine of any or all previous examples wherein the controllable subsystems comprise controllable harvester subsystems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a machine on a worksite during an operation, comprising:

identifying georeferenced data for the worksite that was generated prior to the machine performing the operation at the worksite;

collecting field data with a sensor on the machine, as the machine is performing the operation at the worksite;

generating a first predictive map of at least a portion of the worksite that is predictive of a characteristic at the worksite, based on the georeferenced data, the first predictive map including a first set of predictive values of the characteristic;

generating a second predictive map of at least the portion of the worksite that is predictive of the characteristic at the worksite, based on the field data, the second predictive map including a second set of predictive values of the characteristic;

calculating a first quality metric, for the first predictive map, indicative of an accuracy of the first predictive map, wherein calculating the first quality metric comprises calculating a first error value indicative of error of the first predictive map based, at least in part, on a comparison of a predictive value of the first set of predictive values of the characteristic to a value of the characteristic detected during the operation and calculating the first quality metric based, at least in part, on the first error value;

calculating a second quality metric, for the second predictive map, indicative of an accuracy of the second predictive map, wherein calculating the second quality metric comprises calculating a second error value indicative of error of the second predictive map based, at least in part, on a comparison of a predictive value of the second set of predictive values of the characteristic to the value of the characteristic detected during the operation or to an additional value of the characteristic detected during the operation and calculating the second quality metric based, at least in part, on the second error value;

selecting one of the first predictive map and the second predictive map as a selected map, based on the calculated first quality metric and the calculated second quality metric; and controlling the machine, using the selected map, during the operation.

2. The method of claim 1, wherein selecting one of the first predictive map and the second predictive map as the selected map comprises:

determining whether the first quality metric and the second quality metric meet a quality threshold; and selecting one of the first predictive map and the second predictive map as the selected map based on the determination.

3. The method of claim 1, wherein selecting of the first predictive map and the second predictive map as the selected map comprises:

comparing the first quality metric to the second quality metric; and selecting one of the first predictive map and the second predictive map as the selected map based on the comparison.

4. The method of claim 1, wherein identifying georeferenced data for the worksite comprises:

obtaining, from a remote system, georeferenced vegetative index data for the worksite that was generated prior to the machine performing the operation at the worksite.

5. The method of claim 1, wherein collecting field data, with the sensor on the machine, as the machine is performing the operation at the worksite comprises one of:

collecting, as the field data, plant data, with the sensor as the machine is performing the operation at the worksite, wherein collecting plant data, with the sensor, as the machine is performing the operation at the worksite comprises one of:

collecting, as the plant data, crop moisture data, with the sensor, as the machine is performing the operation at the worksite;

collecting, as the plant data, material other than grain (MOG) moisture data, with the sensor, as the machine is performing the operation at the worksite;

collecting, as the plant data, yield data, with the sensor, as the machine is performing the operation at the worksite;

collecting, as the plant data, feed rate data, with the sensor, as the machine is performing the operation at the worksite; or collecting, as the plant data, mass flow data, with the sensor, as the machine is performing the operation.

6. The method of claim 1, wherein controlling the machine, using the selected map, during the operation comprises:

controlling one or more of a plurality of different subsystems of the machine, using the selected map, during the operation.

7. The method of claim 1, wherein calculating the first quality metric further comprises generating the first quality metric based, at least in part, on weather data indicative of one or more weather conditions at a time at which the georeferenced data was generated.

8. The method of claim 1, wherein calculating the second quality metric further comprises generating the second quality metric based, at least in part, on field obscurant data indicative of whether a field obscurant is present at a time the field data is collected.

9. The method of claim 1 and further comprising:

collecting with the sensor on the machine, as the machine is performing the operation, additional field data;

generating an updated predictive map of at least a different portion of the worksite based, at least in part, on the additional field data;

calculating a third quality metric, for the updated predictive map, indicative of an accuracy of the updated predictive map;

selecting the updated predictive map, as an updated selected map, based on the calculated third quality metric; and controlling the machine, using the updated selected map, during the operation.

10. A computing system configured to control a work machine during an operation at a worksite, comprising:

a communication system configured to obtain georeferenced data for the worksite that was generated prior to the machine performing the operation at the worksite;

an in situ data collection system configured to collect field data, the field data generated by a sensor on the work machine as the work machine is performing the operation at the worksite;

a generator system configured to:

generate a first predictive map of at least a portion of the worksite based on the georeferenced data, the first predictive map including a first set of predictive values of a characteristic; and generate a second predictive map of at least a portion of the worksite based on the field data, the second predictive map including a second set of predictive values of the characteristic;

an evaluation system configured to:

calculate a first error value indicative of error of the first predictive map based, at least in part, on a comparison of a predictive value of the first set of predictive values of the characteristic to a value of the characteristic detected during the operation;

calculate a first quality metric for the first predictive map based, at least in part, on the first error value;

calculate a second error value indicative of error of the second predictive map based, at least in part, on a comparison of a predictive value of the second set of predictive values of the characteristic to the value of the characteristic detected during operation or to an additional value of the characteristic detected during the operation;

calculate a second quality metric for the second predictive map based, at least in part, on the second error value;

determine whether the first predictive map is qualified for machine control based on the first quality metric; and determine whether the second predictive map is qualified for machine control based on the second quality metric; and a control system configured control the machine based on at least one of the first predictive map and the second predictive map.

11. The computing system of claim 10 wherein the evaluation system comprises:

a quality metric generator configured to:

calculate the first quality metric for the first predictive map based further, at least in part, on a first set of quality rules; and calculate the second quality metric for the second predictive map based further, at least in part, on a second set of quality rules, the first set of quality rules different than the second set of quality rules.

12. The computing system of claim 10 wherein the evaluation system comprises:

evaluation trigger logic configured to:

detect an evaluation trigger and, in response, generate a trigger output for the evaluation system to evaluate an alternative predictive map, wherein the evaluation trigger comprises a determination that neither the first predictive map nor the second predictive map are qualified for machine control; and generate, in response to the trigger output, an alternative predictive map using different data for the worksite, the different data different than the georeferenced data and the field data.

13. The computer system of claim 10, wherein the evaluation system is configured to:

determine that the first predictive map is qualified for machine control based on the first quality metric;

determine that the second predictive map is qualified for machine control based on the second quality metric; and aggregate, based on the determination that the first predictive map is qualified for machine control and based on the determination that the second predictive map is qualified for machine control, the first set of predictive values of the characteristic and the second set of predictive values of the characteristic to generate a set of aggregated predictive values of the characteristic, wherein the control system is configured to control the machine based on the set of aggregated predictive values of the characteristic.

14. The computing system of claim 10 wherein the generator system is configured to:

generate the first predictive map as corresponding to a first controllable subsystem of the work machine; and generate the second predictive map as corresponding to a second controllable subsystem of the work machine, wherein the control system is configured to control the first controllable subsystem of the work machine based on the first predictive map and to control the second controllable subsystem of the work machine based on the second predictive map.

15. A system comprising:

a generator system configured to generate each predictive map of a plurality of different predictive maps of at least a portion of a worksite based on a respective set of one or more items of data of a plurality of sets of one or more items of data, each respective set of one or more items of data different than the other sets of one or more items of data of the plurality of sets of one or more items of data, each predictive map, of the plurality of different predictive maps, predictive of a same characteristic at a same location in the worksite and having a respective predictive value of the same characteristic at the same location;

an evaluation system configured to:

calculate a respective error value for each predictive map of the plurality of different predictive maps based, at least in part, on a comparison of the respective predictive value of the same characteristic of each predictive map of the plurality of different predictive maps to a value of the same characteristic detected during an operation;

calculate a respective quality metric for each predictive map of the plurality of different predictive maps based, at least in part, on the respective error value for each predictive map of the plurality of different predictive maps; and select one of the predictive maps, of the plurality of different predictive maps, as a selected map based on the respective quality metric for each predictive map; and a control system configured to control a work machine at the worksite during the operation based on the selected map.

16. The system of claim 15, wherein each respective set of one or more items of data is different than the other sets of one or more items of data of the plurality of sets of one or more items of data in that each item of data of the one or more items of data of each respective set of one or more of data is different than each item of data of the one or more items of data of each other sets of data of the plurality of sets of one or more items of data.

17. The system of claim 15, wherein each respective set of one or more items of data of the plurality of sets of one or more items of data is different than the other sets of one or more items of data of the plurality of sets of one or more items of data in that at least one of the one or more items of data of each respective set of one or more items of data is collected at a different time than at least one of the one or more items of data of each other set of one or more items of data of the plurality of sets of one or more items of data.

18. The system of claim 15, wherein each respective set of one or more items of data of the plurality of sets of one or more items of data is different than the other sets of one or more items of data of the plurality of sets of one or more items of data in that at least one of the one or more items of data of each respective set of one or more items of data is collected from a different source than at least one of the one or more items of data of each other set of one or more items of data of the plurality of sets of one or more items of data.

19. The system of claim 15, wherein each respective set of one or more items of data of the plurality of sets of one or more items of data is different than the other sets of one or more items of data of the plurality of sets of one or more items of data in that at least one of the one or more items of data of each respective set of one or more items of data is of a different type than at least one of the one or more items of data of each other set of one or more items of data of the plurality of sets of one or more items of data.

* * * * *